US008020212B2

(12) United States Patent
Takashima

(10) Patent No.: US 8,020,212 B2
(45) Date of Patent: Sep. 13, 2011

(54) INFORMATION PROCESSING APPARATUS AND METHOD, CONTENT MANAGEMENT SYSTEM, INFORMATION RECORDING MEDIUM, AND COMPUTER PROGRAM

(75) Inventor: Yoshikazu Takashima, Tokyo (JP)

(73) Assignee: Sony Corporation, Tokyo (JP)

( * ) Notice: Subject to any disclaimer, the term of this patent is extended or adjusted under 35 U.S.C. 154(b) by 1168 days.

(21) Appl. No.: 11/350,708

(22) Filed: Feb. 9, 2006

(65) Prior Publication Data

US 2006/0195911 A1 Aug. 31, 2006

(30) Foreign Application Priority Data

Feb. 10, 2005 (JP) ................................ P2005-035108

(51) Int. Cl.
*G06F 12/00* (2006.01)
(52) U.S. Cl. .......................................................... 726/27
(58) Field of Classification Search ...................... 726/27
See application file for complete search history.

(56) References Cited

U.S. PATENT DOCUMENTS

| | | | | |
|---|---|---|---|---|
| 6,502,194 | B1* | 12/2002 | Berman et al. ................... | 726/28 |
| 7,266,704 | B2* | 9/2007 | Levy ............................. | 713/193 |
| 7,610,359 | B2* | 10/2009 | Yoon et al. .................... | 709/219 |
| 2001/0055467 | A1* | 12/2001 | Nakatani et al. ................ | 386/46 |
| 2003/0215224 | A1* | 11/2003 | Yoo et al. ....................... | 386/125 |
| 2003/0217279 | A1* | 11/2003 | Fuchigami et al. ........... | 713/189 |
| 2004/0148516 | A1* | 7/2004 | Tohgi et al. .................... | 713/200 |
| 2004/0177385 | A1* | 9/2004 | Yoo et al. ....................... | 725/142 |
| 2004/0199523 | A1 | 10/2004 | Sako et al. | |
| 2004/0235567 | A1* | 11/2004 | Chatani .......................... | 463/42 |
| 2005/0039032 | A1* | 2/2005 | Babowicz et al. ............ | 713/193 |
| 2005/0117880 | A1* | 6/2005 | Seo et al. ....................... | 386/69 |
| 2006/0104190 | A1* | 5/2006 | Babinski ..................... | 369/275.1 |

FOREIGN PATENT DOCUMENTS

| | | |
|---|---|---|
| JP | 2003-308645 | 10/2003 |
| JP | 2004-087062 | 3/2004 |

* cited by examiner

*Primary Examiner* — Michael Pyzocha
(74) *Attorney, Agent, or Firm* — K&L Gates LLP

(57) ABSTRACT

An information processing apparatus including a data processor and a communication unit is provided. For a content management unit provided with corresponding usage control information, the data processor executes a program corresponding to the content management unit, and obtains identification information set for the content management unit from an information recording medium and sends, via the communication unit, the obtained identification information to an access destination which is determined based on information indicated in the program, so that the data processor performs processing for obtaining download data set for the content management unit via the communication unit or for obtaining playback permission information concerning content corresponding to the content management unit via the communication unit.

13 Claims, 24 Drawing Sheets

FIG. 6

```
<body>
    <cci_info type="basic">
        <cci_value type="EPN" data="0"/>
        <cci_value type="CCI" data="01"/>
        <cci_value type="Image_Constraint_token" data="0"/>
        <cci_value type="APS" data="1"/>
    </cci_info>
    <cci_info type="id">
        <cci_value type="Studio_ID" data="AAAAAAA"/>
        <cci_value type="Package_ID" data="BBBBBBB"/>
        <cci_value type="CPS_Unit_ID" data="001"/>
    </cci_info>
    ..
</body>
```

```
<body>
<cci_info type="basic" data="00101"/>  — 541
<cci_info type="id" data="AAAAAAABBBBBBB001"/>  — 542
  ..
</body>
```

FIG. 8

```
<body>
<div id="div01"/>
<object id="Vstream" type="video" data="PlayList#001"/>    :REFERENCE TO PLAYLIST
<object id="Astream" type="audio" data="Sound.pcm"/>       :REFERENCE TO AUDIO FILE
<object id="Still" type="image/jpeg" data="Image.jpg"/>    :REFERENCE TO STILL IMAGE FILE
<a href="/MoreInfo.xml">MoreInfo</a>                       :REFERENCE TO ANOTHER DATA FILE
</div>
</body>
```

FIG. 9

```
<body>
<div id="div01"/>
<object id="Vstream" type="video" data="PlayList#001"/>    :REFERENCE TO PLAYLIST
<object id="Astream" type="audio" data="Sound.pcm"/>       :REFERENCE TO AUDIO FILE
<object id="Still" type="image/jpeg" data="Image.jpg"/>    :REFERENCE TO STILL IMAGE FILE
<object id="Subtitle" type="text" data="[Server URL]/Subtitle1.txt"/>   :DOWNLOAD AND DISPLAY TEXT FILE
</div>
</body>
```

FIG. 10

```
<body>
<div id="div01"/>
<object id="Vstream" type="video" data="PlayList#001"/>    :REFERENCE TO PLAYLIST
<object id="Astream" type="audio" data="Sound.pcm"/>       :REFERENCE TO AUDIO FILE
<object id="Still" type="image/jpeg" data="Image.jpg"/>    :REFERENCE TO STILL IMAGE FILE
<script StartDownload() data="[Server URL]" />             :START DOWNLOADING
</div>
</body>
```

FIG. 11

```
<body>
<div id="div01"/>
<object id="Vstream" type="video" data="PlayList#001"/>    :REFERENCE TO PLAYLIST
<object id="Astream" type="audio" data="Sound.pcm"/>        :REFERENCE TO AUDIO FILE
<object id="Still" type="image/jpeg" data="Image.jpg"/>     :REFERENCE TO STILL IMAGE FILE
<script StartDownload() data="[Server URL]" extention="value1"/>  :START DOWNLOADING
                                                                    WITH ADDITIONAL
                                                                    SENDING INFORMATION
</div>
</body>
```

FIG. 12

```
<body>
<div id="div01"/>
<object id="Vstream" type="video" data="PlayList#001"/>    :REFERENCE TO PLAYLIST
<object id="Astream" type="audio" data="Sound.pcm"/>       :REFERENCE TO AUDIO FILE
<object id="Still" type="image/jpeg" data="Image.jpg"/>    :REFERENCE TO STILL IMAGE FILE
<script CheckPlayable() data="[Server URL]"/>              :CHECK PERMISSION OF PLAYBACK
                                                            WITHOUT ADDITIONAL
                                                            SENDING INFORMATION
</div>
</body>
```

FIG. 13

```
<body>
<div id="div01"/>
<object id="Vstream" type="video" data="PlayList#001"/>    :REFERENCE TO PLAYLIST
<object id="Astream" type="audio" data="Sound.pcm"/>       :REFERENCE TO AUDIO FILE
<object id="Still" type="image/jpeg" data="Image.jpg"/>    :REFERENCE TO STILL IMAGE FILE
<script CheckPlayable() data="[Server URL]" extention="value1"/>  :CHECK PERMISSION OF PLAYBACK
                                                                   WITH ADDITIONAL SENDING
                                                                   INFORMATION
</div>
</body>
```

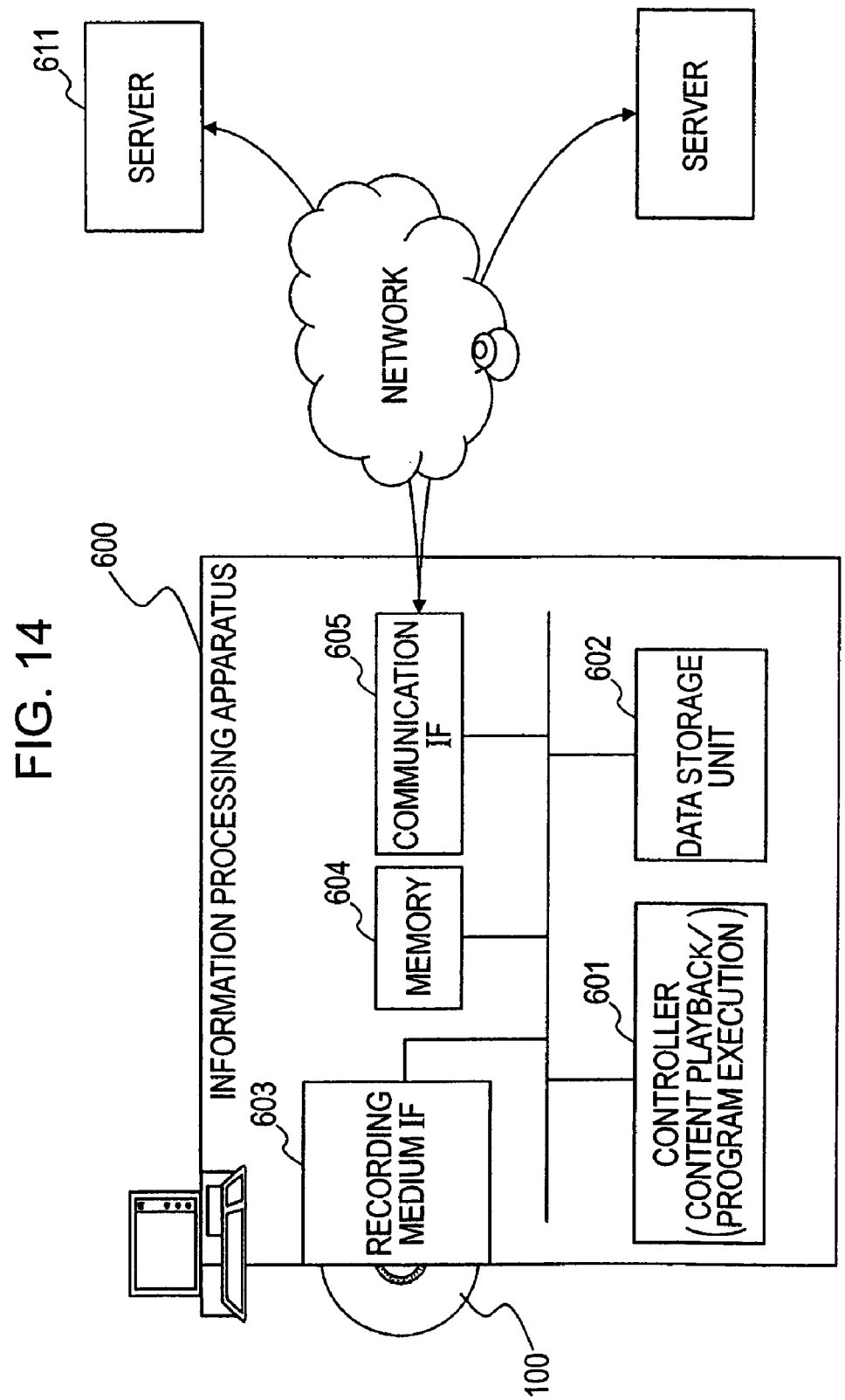

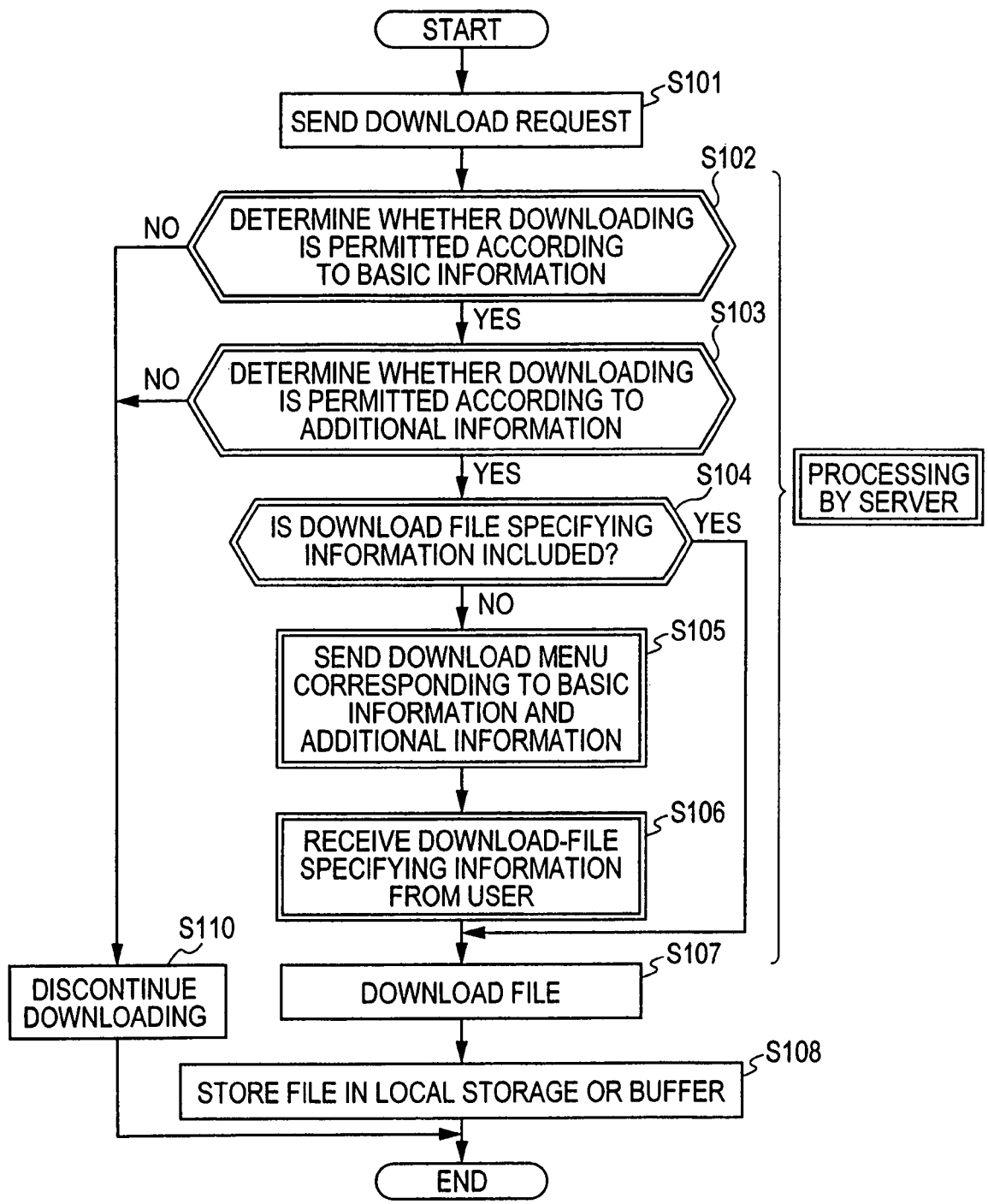

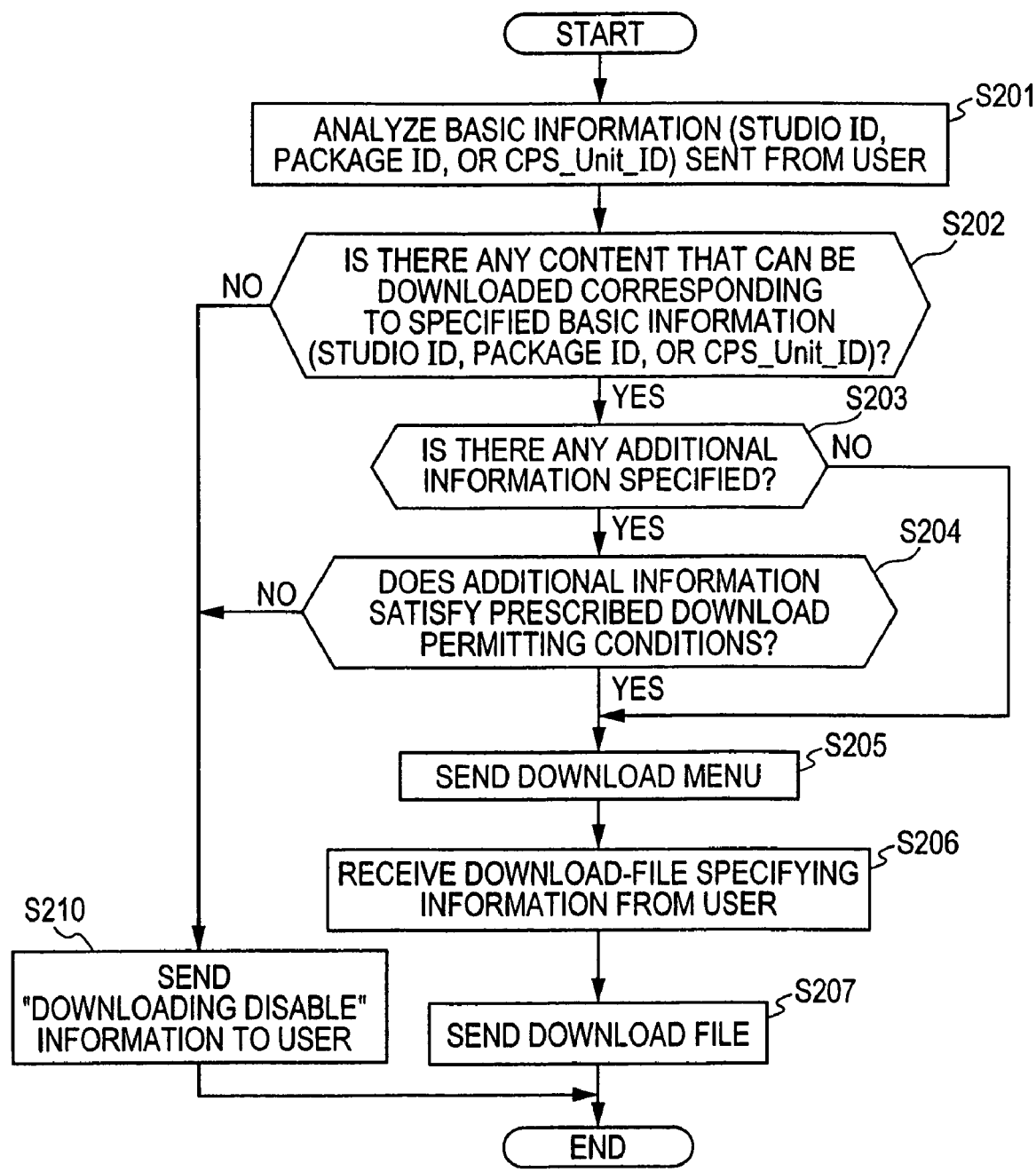

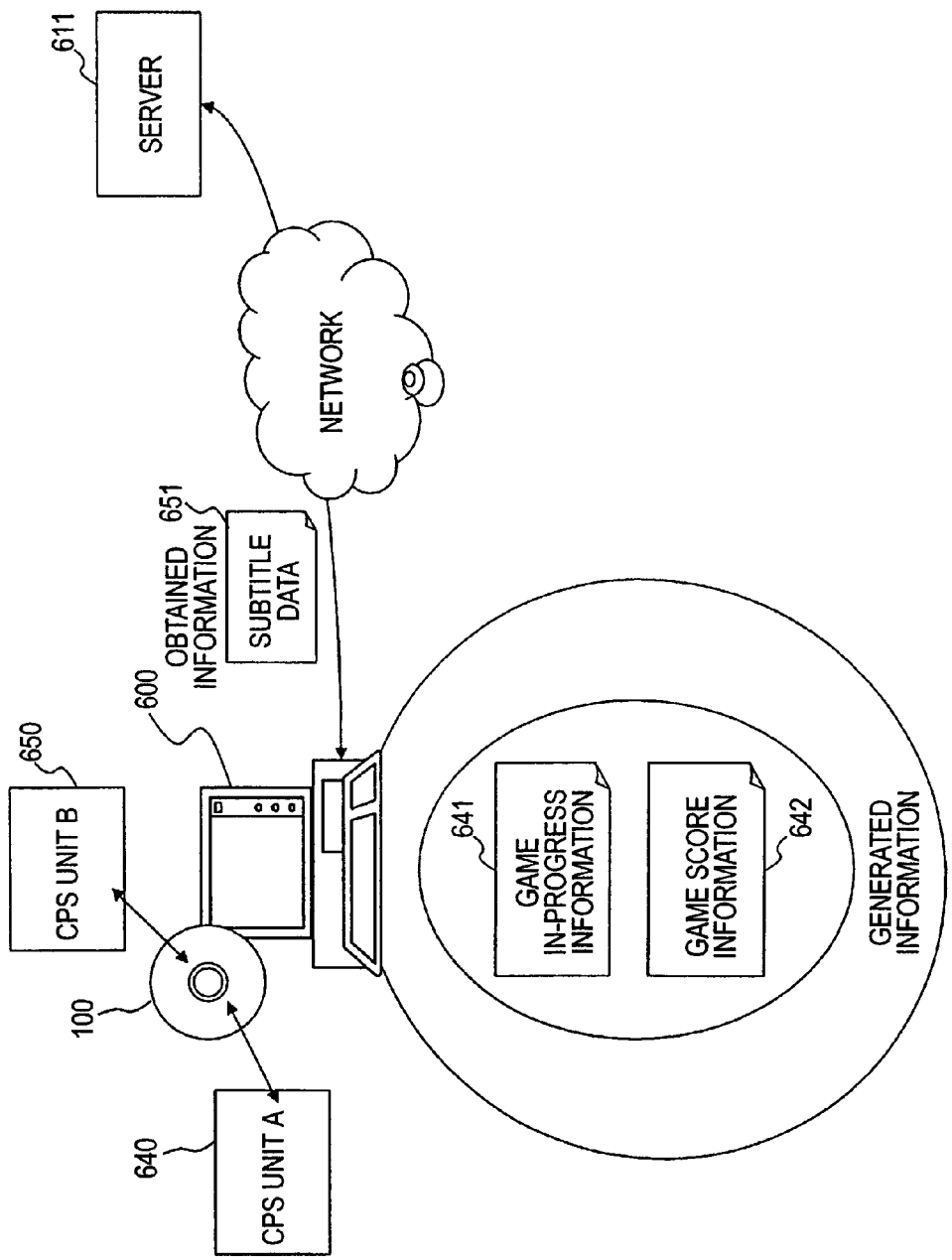

INFORMATION PROCESSING APPARATUS AND METHOD, CONTENT MANAGEMENT SYSTEM, INFORMATION RECORDING MEDIUM, AND COMPUTER PROGRAM

CROSS-REFERENCE TO RELATED APPLICATIONS

The present application claims priority to Japanese Patent Application JP 2005-035108 filed in the Japanese Patent Office on Feb. 10, 2005, the entire contents of which are incorporated herein by reference.

BACKGROUND

The present application generally relates to information processing apparatuses and methods, content management systems, information recording media, and computer programs. More particularly, the application relates to an information processing apparatus and method, a content management system, an information recording medium, and a computer program in which the use of content is managed on the basis of management units, and the playback operation of content or downloading of data generated or obtained afterwards (subsequently generated/obtained data) is controlled by using playback programs forming content management units.

Various software data (hereinafter referred to as "content"), such as audio data (e.g., music), image data (e.g., movies, game programs, and various application programs), can be stored on recording media, for example, Blu-ray Disc™ using blue laser light, digital versatile discs (DVDs), mini discs (MDs), compact discs (CDs), as digital data. In particular, Blu-ray Discs™ using blue laser light are high-density recording discs and can record a large volume of video content as high-quality image data.

Digital content is stored in various information recording media, such as those described above, and is provided to users. A user uses the digital content by playing it back on the user's personal computer (PC) or a player, such as a disc player.

Generally, the distribution rights of many content data, such as music data and image data, are owned by creators or sellers of such content data. Basically, therefore, certain usage restrictions are imposed when distributing content, that is, the use of content is allowed only for authorized users, thereby preventing unauthorized copying.

According to digital recording apparatuses and recording media, images and sound can be repeatedly recorded and played back without a loss in quality. Thus, the distribution of illegally copied content via the Internet, the circulation of recording media, such as compact disc recordable (CD-R) discs, recording copied content thereon, so-called "pirated discs", the use of copied content stored in hard disks of, for example, PCs, are widespread.

DVDs or large-capacity recording media, such as those using blue laser light which have recently been developed, can record a large volume of data, for example, up to several movies, on one medium, as digital information. Since video information can be recorded as digital information as described above, it is becoming important to perform copyright protection by preventing unauthorized copying. Nowadays, to prevent unauthorized copying of digital data, various techniques for preventing unauthorized copying are practically applied to digital recording apparatuses or recording media.

For example, in DVD players, a content scrambling system is employed. According to the content scrambling system, data such as video data or sound data is encrypted and recorded on, for example, a digital versatile disc read only memory (DVD-ROM), and a key for decrypting the encrypted data is supplied to licensed DVD players. A license is given to DVD players that are designed in compliance with predetermined operation rules, for example, agreeing not to perform unauthorized copying. Accordingly, licensed DVD players can decrypt data recorded on a DVD-ROM by using the given key to play back images or sound from the DVD-ROM.

On the other hand, unlicensed DVD players are unable to play back data recorded on the DVD-ROM since they do not have the key for decrypting the encrypted data. In this manner, in the content scrambling system, DVD players that do not satisfy conditions demanded for receiving a license are unable to play back digital data from a DVD-ROM, thereby preventing unauthorized copying.

A sufficiently secure management system is constructed for content stored in information recording media, as described above. In current systems, however, the total exclusion of the unauthorized use of content is difficult. For example, configurations in which data is generated afterwards by executing a program recorded on a DVD-ROM or data or content is obtained from external servers are disclosed in Japanese Unexamined Patent Application Publication Nos. 2004-087062 and 2003-308645. It is however difficult to implement the secure data management or usage management by the configurations disclosed in the above publications.

SUMMARY

It is thus desirable to provide an information processing apparatus and method, a content management system, an information recording medium, and a computer program in which various items of content, which require usage management, such as copyright management, are managed on the basis of management units, and the playback operation of content or downloading of data generated or obtained afterwards (subsequently generated/obtained data) is controlled by using playback programs forming content management units.

According to an embodiment, there is provided an information processing apparatus including a data processor and a communication unit. For a content management unit provided with corresponding usage control information, the data processor executes a program corresponding to the content management unit, and obtains identification information set for the content management unit from an information recording medium and sends, via the communication unit, the obtained identification information to an access destination which is determined based on information indicated in the program. The data processor performs processing for obtaining download data set for the content management unit via the communication unit or for obtaining playback permission information concerning content corresponding to the content management unit.

If the program is a data sending execution program including additional information used for determining whether a download permitting condition or a playback permitting condition is satisfied, the data processor may send the additional information to the access destination.

The data processor may obtain, as the identification information, at least one of a studio ID, which serves as an identifier of a studio, which is an entity for providing the content included in the content management unit, a package ID or a volume ID, which serves as identification information concerning a manufacturing unit of the information recording medium, and a content management unit ID, which serves as an identifier of the content management unit, from the information recording medium, and may send the identification information to the access destination.

The data processor may obtain the identification information from the usage control information recorded in the information recording medium in association with the content management unit.

The data processor may generate an encrypted file including the download data obtained from the access destination, and may set the encrypted file as a file included in a content management unit provided with corresponding usage control information.

The data processor may play back the content included in the content management unit on the condition that the playback permission information is obtained from the access destination.

According to another embodiment, there is provided a content management system including a client configured to execute a program corresponding to a content management unit recorded on an information recording medium, the information recording medium recording content management units in association with corresponding usage control information, and a server configured to receive identification information set for the content management unit associated with the program from the client. The server determines based on the identification information received from the client whether download data set for the content management unit is to be provided or whether content playback permission information concerning content corresponding to the content management unit is to be provided.

If the program is a data sending execution program including additional information used for determining whether a download permitting condition or a playback permitting condition is satisfied, the client may also send the additional information to the server, and the server may determine based on the additional information received from the client whether the download data set for the content management unit is to be provided or whether the content playback permission information concerning the content corresponding to the content management unit is to be provided.

The identification information may include at least one of a studio ID, which serves as an identifier of a studio, which is an entity for providing the content included in the content management unit, a package ID or a volume ID, which serves as identification information concerning a manufacturing unit of the information recording medium, and a content management unit ID, which serves as an identifier of the content management unit.

According to another embodiment, there is provided an information recording medium storing content management units, each being provided with corresponding usage control information, and including a program corresponding to each of the content management units as storage information. The program includes one of information concerning a location from which download data set for the content management unit associated with the program is obtained or information concerning a location from which playback permission information concerning content corresponding to the content management unit is obtained.

The program may be a data sending execution program including additional information used for determining whether a download permitting condition or a playback permitting condition is satisfied.

According to another embodiment, there is provided an information processing method including the steps of: executing a program corresponding to a content management unit recorded on an information recording medium, the information recording medium recording content management units in association with corresponding usage control information; obtaining identification information set for the content management unit corresponding to the program from the information recording medium; sending the obtained identification information to an access destination determined based on information indicated in the program; and performing processing for obtaining download data set for the content management unit or for obtaining playback permission information concerning content corresponding to the content management unit.

According to another embodiment, there is provided a computer program for allowing a computer to execute information processing including the steps of: executing a program corresponding to a content management unit recorded on an information recording medium, the information recording medium recording content management units, each being provided with corresponding usage control information; obtaining identification information set for the content management unit corresponding to the program from the information recording medium; sending the obtained identification information to an access destination determined based on information indicated in the program; and performing processing for obtaining download data set for the content management unit or for obtaining playback permission information concerning content corresponding to the content management unit.

According to another embodiment, there is provided an information processing apparatus including a data processor configured to execute, for a content management unit provided with corresponding usage control information, a program corresponding to the content management unit, to send a studio ID or a package ID obtained from an information recording medium to an access destination determined by the execution of the program corresponding to the content management unit, and to perform processing for obtaining download data set for the content management unit or for obtaining playback permission information concerning content corresponding to the content management unit.

The computer program according to an embodiment of the present invention is a program that can be provided by means of a computer-readable storage medium, such as a CD, and a magneto-optical (MO) disk, or a communication medium, such as a network, to a computer system that can execute various program codes. By providing the computer program in a computer-readable format, processing corresponding to the program can be executed in the computer system.

Further objects, features, and advantages will become apparent from the following description of exemplary embodiments with reference to the attached drawings. In this specification, a system refers to a logical set including a plurality of devices. It should be appreciated that the devices need not be in the same housing.

According to a configuration of an embodiment, various items of content, which requires usage management, such as copyright management, can be managed on the basis of management units, and also, the playback operation of content or downloading of data generated or obtained afterwards (subsequently generated/obtained data) can be controlled by using playback programs forming content management units. More specifically, a program corresponding to a content management unit recorded on an information recording medium is executed, the information recording medium storing content management units in association with corresponding usage control information. Then, identification information set for the content management unit is sent to a server, which is determined based on information indicated in the program. With this configuration, after authenticating the user as an authorized user based on the identification information, the server can provide download data corresponding to the content management unit or playback permission information concerning content included in the content management unit.

Additional features and advantages are described herein, and will be apparent from, the following Detailed Description and the figures.

BRIEF DESCRIPTION OF THE FIGURES

FIGS. 6 and 7 illustrate examples of the data structures of content usage control information;

FIG. 8 illustrates an example of the data structure of a content playback program;

FIGS. 9, 10, and 11 illustrate examples of the program structures accompanying download processing in content playback programs;

FIGS. 12 and 13 illustrate examples of the program structures accompanying playback permission information obtaining processing in content playback programs;

FIG. 14 illustrates the configuration of an information processing apparatus for generating or obtaining data afterwards;

FIG. 15 is a flowchart illustrating a downloading processing sequence;

FIG. 16 is a flowchart illustrating details of processing by a server in the downloading processing sequence shown in FIG. 15;

FIG. 17 illustrates an example of data subsequently generated or obtained by an information processing apparatus;

DETAILED DESCRIPTION

Details of an information processing apparatus and method, a content management system, an information recording medium, and a computer program according to an embodiment are described below in the order of the following sections and with reference to the accompanying drawings.

1. Storage Data of Information Recording Medium
2. Content Storage Structure
3. Encryption and Usage Management of Storage Data
4. Specific Examples of Playback Programs
5. Content Usage Processing Accompanying Access to Server
5-1. Content Downloading from Server by Playback Program
5-2. Obtaining Playback Permission Information from Server by Playback Program
6. Example of Configuration of Information Processing Apparatus 1. Storage Data of Information Recording Medium The information processing apparatus according to an embodiment implements usage control for content stored in information recording media on the basis of content management units, and also controls the playback operation of content or downloading of subsequently generated/obtained data by using playback programs forming content management units. An example of storage data of an information recording medium 100 storing content, which is managed on the basis of management units, is discussed below with reference to FIG. 1.

Figure 1:
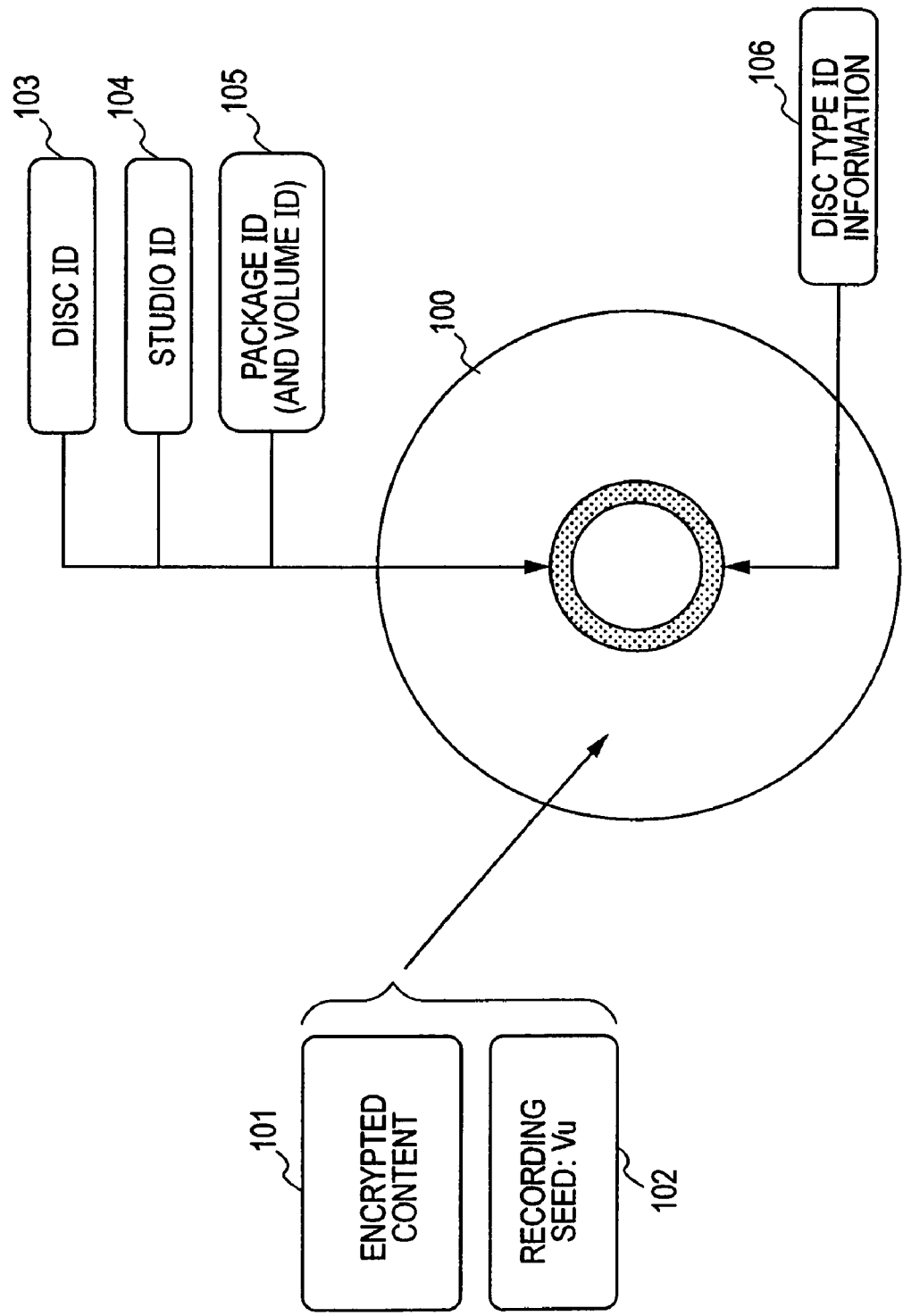
FIG. 1 illustrates the structure of data stored in an information recording medium.

The information recording medium 100 storing authorized content is manufactured in a disc manufacturing factory with the permission of a so-called "content right holder" having an authorized content copyright or distribution right. In the following embodiment, the information recording medium 100 is discussed in the context of a disc medium. However, it should be appreciated that various information recording media may be used. In this example, information stored in a ROM disc, which is a content storing disc, is shown in FIG. 1.

In the information recording medium 100, content 101, such as audiovisual (AV) streams of moving picture content, for example, high definition (HD) movie content, which is HD image data, game programs, image files, sound data, or text data, defined by specific standards is stored. The content 101 includes various modes of information, such as content information that can be used only by data from the information recording medium 100, and content information that can be used by a combination of the data from the information recording medium 100 and data provided from a server connected to the recording medium 100 via a network.

At least part of the content 101 stored in the information recording medium 100 is encrypted, and recording seeds (REC SEED) Vu 102, which serve as information necessary for generating keys for decrypting the encrypted data, are also stored in the information recording medium 100. Before being stored in the information recording medium 100, for the content usage management, the content is encrypted by unit keys as individual cryptographic keys. The recording seeds 102 are key generation information for generating individual unit keys. Instead of being stored in the information recording medium 100, the recording seeds 102 may be obtained from a server connected to the information recording medium 100.

The information recording medium 100 also stores a disc ID 103 as identification information for the information recording medium 100, a studio ID 104 as an identifier of an editing studio that edits the content 101 stored in the information recording medium 100, a package ID 105 as a package identifier, which serves as the manufacturing unit of the information recording medium 100, and disc type identification information 106. In addition to the package ID 105, a volume ID as a volume identifier indicating a different manufacturing unit of the information recording medium 100 may be stored. The package ID can uniquely specify target content, together with the studio ID. In contrast, the volume ID is an ID given for each mother optical disc. Accordingly, optical discs generated from one mother disc have the same volume ID, and if all items of content recorded in the information recording medium are formed from the same mother disc, both the volume ID and the package ID serve as the manufacturing unit of the content.

Content to be stored in the information recording medium 100 includes AV streams of moving picture content, for example, HD movie content, which is HD image data, game programs, image files, sound data, and text data defined by specific standards. If the information recording medium 100 is a Blu-ray Disc™, which is high-density data recording disc using blue laser light, data based on the Blu-ray ROM™ standard format is stored as main content.

Data having a data format which is not compliant with a specific AV data format, such as game programs, image files, sound data, or text data, which serve as service data, may be stored as sub-content.

For the content usage management, various items of content 101 are stored in the information recording medium 100 by being encrypted with the corresponding unit keys. The recording seeds 102 are used as the key generating information for generating the unit keys.

More specifically, the various items of content 101, such as AV streams, music data, image data, for example, moving pictures and still images, game programs, and web content, are divided into units as content usage management units, and the different recording seeds 102 are assigned to the corresponding divided units to generate unit keys based on the recording seeds. The encrypted content is then decrypted by using the unit keys so that it can be played back.

For example, to use the content 101, such as AV streams, stored in the information recording medium 100, a predetermined cryptographic key generating sequence using the recording seed 102 and other private information (not shown), such as physical indexes, recorded on the information recording medium 100, can be executed so that the unit key associated with the unit can be obtained, and then, the encrypted content contained in the unit is decrypted based on the obtained unit key.

Figure 2:
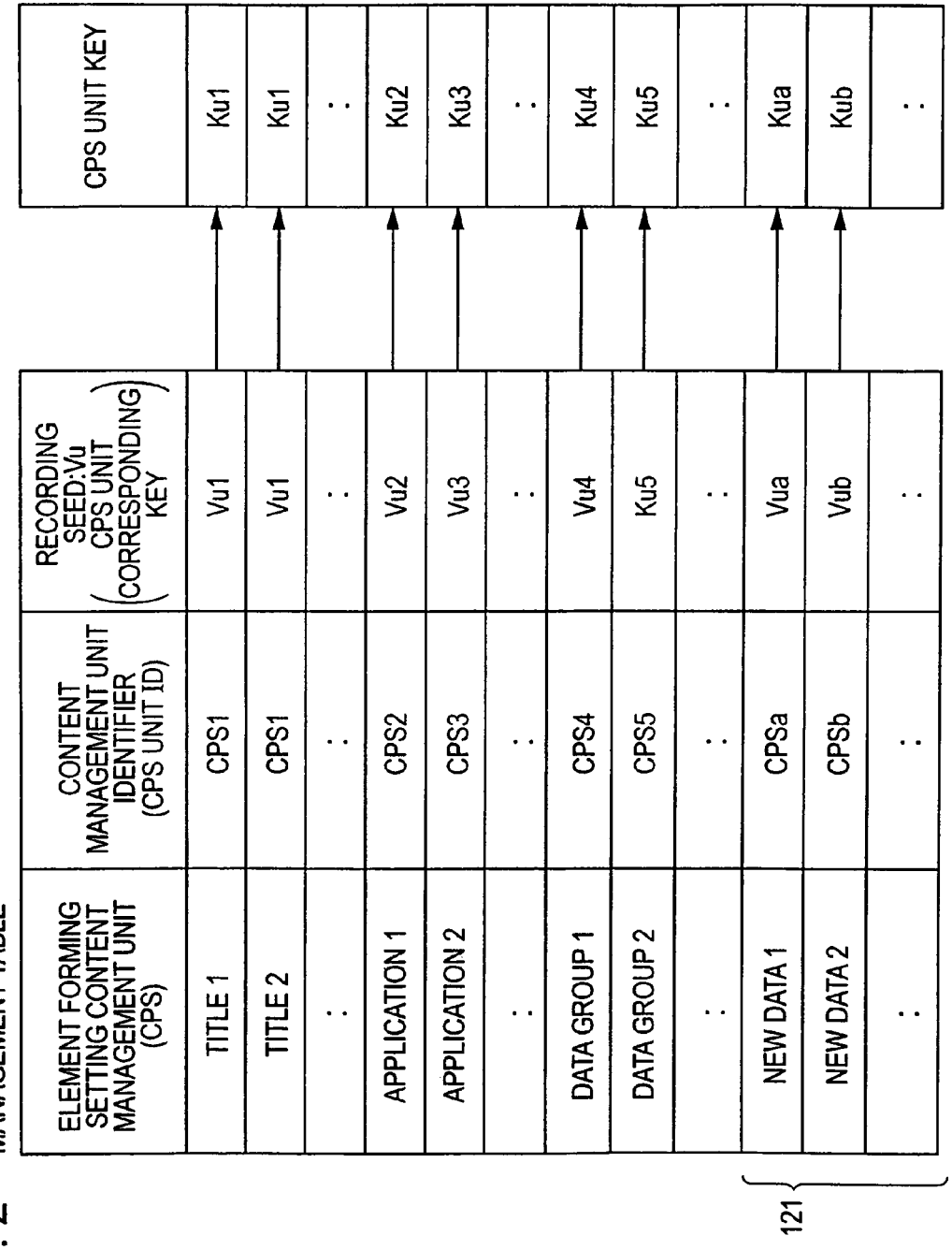
FIG. 2 illustrates an example of a content protection system (CPS) unit management table.

As stated above, the various items of encrypted content 101 stored in the information recording medium 100 are divided into units, which serve as units for content usage management, which are referred to as "content protection system (CPS) units" (content management units). The correspondence between the CPS unit structure and the recording seeds is shown in FIG. 2 by way of example. More specifically, FIG. 2 illustrates the correspondence between a CPS unit management table, which is content management information, stored in the information recording medium 100, and CPS unit keys that can be generated based on the recording seeds associated with the individual CPS units.

The CPS unit management table shown in FIG. 2 shows that elements forming CPS units include titles, applications, and data groups of content, and that CPS unit IDs, which serve as identifiers for the CPS units, and recording seed information for the CPS units are associated with the CPS units.

In FIG. 2, title 1 is set as CPS unit 1 in association with recording seed Vu1. Title 2 is also set as CPS unit 1 in association with recording seed Vu1. Application 1 is set as CPS unit 2 in association with recording seed Vu2.

For example, unit key Ku1 is generated based on the recording seed Vu1, and encrypted content contained in the CPS unit 1 (CPS1) that can be identified by title 1 and title 2 can be decrypted with the unit key Ku1. Similarly, unit key Ku2 is generated based on the recording seed Vu2, and encrypted content contained in the CPS unit 2 (CPS2) that can be identified by application 1 can be decrypted with the unit key Ku2. The same applies to the rest of the unit keys.

The CPS unit management table includes, not only CPS units for content stored in the information recording medium 100, but also CPS units corresponding to a new data field 121 in FIG. 2 for subsequently generated/obtained data, such as data generated by a user or obtained from an external source. Users can define the CPS units for subsequently generated/obtained data.

The CPS units can be set as management units for subsequently generated/obtained data, such as data obtained by executing content, for example, programs, stored in the information recording medium 100. More specifically, the subsequently generated/obtained data includes information concerning a game in progress or concerning the score of a game, or sub-data associated with AV streams stored in the information recording medium 100, for example, subtitle data obtained from an external server. Details of the usage modes of the CPS units are discussed below.

2. Content Storage Structure

The format of content stored in an information recording medium is described below with reference to FIG. 3.

Figure 3:
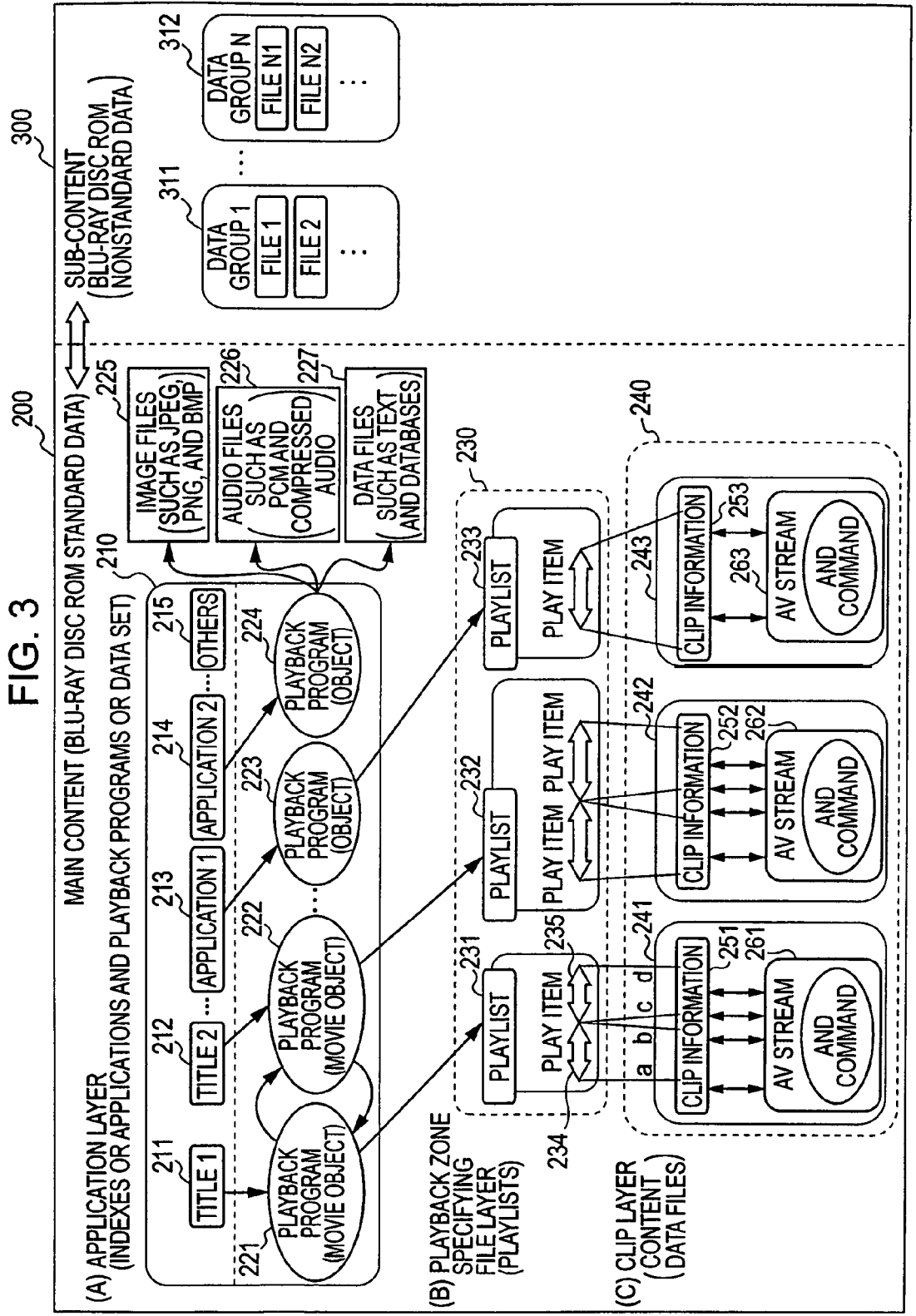
FIG. 3 illustrates an example of setting content management units from content stored in an information recording medium.

In an information recording medium, as shown in FIG. 3, AV streams of motion picture content, such as HD movie content, which is HD image data, are stored as main content 200, and other data and programs, such as game programs, images files, music data, and text data, which serve as service data, are stored as sub-content 300.

The main content 200 is stored according to a specific AV format, for example, the Blu-ray Disc™ ROM standard format, as the Blu-ray Disc™ ROM data. The sub-content 300 is stored according to a certain format that does not conform to the Blu-ray Disc™ ROM standard format as the Blu-ray Disc™ ROM nonstandard data.

FIG. 3 shows that the main content 200 based on the Blu-ray Disc™ ROM standard format includes moving picture data (AV streams) as real content to be played back, and has a hierarchical structure according to the Blu-ray Disc™ ROM standard format (i.e., an application layer 210 indicated by (A) in FIG. 3, a playback zone specifying file layer (playlist layer) 230 indicated by (B), and a clip layer (content data files) 240 indicated by (C)).

The clip layer 240 includes clips 241, 242, and 243, which are divided content data files. The clips 241, 242, and 243 include AV stream files 261, 262, and 263, respectively, and clip information files 251, 252, and 253, respectively.

The clip information file 251 is a data file storing attribute information concerning the AV stream file 261. The AV stream file 261 is, for example, moving picture experts group transport stream (MPEG-TS) data, and has a data structure in which various items of information concerning images (video), audio, subtitle data, etc. are multiplexed. Command information for controlling a playback apparatus during a playback operation may also be multiplexed in the AV stream file 261.

The playback zone specifying file layer (playlist layer) 230 includes a plurality of playback zone specifying files (playlists) 231, 232, and 233. Each of the playlists 231, 232, and 233 selects one of the plurality of AV stream data files contained in the clip layer 240, and as a result, the playlist has at least one play item that specifies a specific data portion of the selected AV stream data file as the playback start point and the playback end point. By selecting one of the playlists 231, 232, and 233, the playback sequence can be determined according to the play item contained in the selected playlist so that a playback operation is started.

For example, it is now assumed that the playlist 231 is selected. In this case, the play item 234 associated with the playlist 231 has playback start point a and playback end point b in the clip 241, and the play item 235 has playback start point c and playback end point d in the clip 241. Accordingly, specific data areas from a to b and from c to d of the AV stream data file 261 contained in the clip 241 are played back.

The application layer 210 is set as a layer having a combination of an application index file 211 or 212 including a content title to be displayed on a display unit used for playing back content and a playback program 221 or 222, or a combination of an application execution file 213, 214, or 215, such as game content or web content, and a playback program 223 or 224. The user can determine content to be played back by selecting the title contained in the application index file 211 or 212.

Each title is associated with the corresponding playback program 221, 222, 223, or 224, for example, a movie object, as shown in FIG. 3, and when the user selects one of the titles, playback processing is started based on the playback program associated with the selected title. The application index file 211 or 212 indicated by title 1 or title 2, respectively, includes a title presenting program for displaying titles and menus of content that is automatically played back when an information recording medium is set or operated.

The application index file 211 or 212 or the application execution file 213 or 213 may include an application resource file used for running an application. Alternatively, various data files that can be obtained from an information recording medium or a network connecting server, such as image files 225 based on, for example, joint picture experts group (JPEG), PNG, or bitmap (BMP), audio files 226 based on, for example, pulse code modulation (PCM) or compressed audio, and data files 227 for text and databases, may be used as the application resource files.

The playback programs (for example, movie objects) 221 through 224 are content playback processing programs that can specify playback zone specifying files (playlists), and that can also provide functions required for presenting playback content (HD movie content) in a programmable manner, such as functions of responding to operation information concerning content playback processing input from a user, jumping between titles, and branching the playback sequence. The playback programs 221 through 224 can be jumped from one another, and the playback program to be executed is selected by the user or according to a preset program, and the playback content can be selected and played back from the clip 241, 242, or 243 through the playlist 231, 232, or 233 designated by the selected playback program.

The playback programs 221 through 224 can be set as, for example:

(1) playback programs having a program format, such as Java™, and referring to playlists, other images, sound, and data files; and (2) playback programs having a structure in a tag format, such as hypertext markup language (HTML) or extensible markup language (XML), and referring to playlist, other images, sound, and data files.

For example, a playback program having a tag format, such as XML, can be set as the following various program structures:

(a) specifying a playlist or various data files necessary for playing back content in a CPS unit (content management unit);

(b) including information concerning a server to provide download content and controlling the execution of downloading processing; and (c) querying a server as to whether content in a CPS unit (content management unit) can be played back.

Specific structures of such programs are described in the following section (4. Specific Examples of Playback Programs).

The main content 200 is managed, as shown in FIG. 3, as, for example, the Blu-ray Disc™ ROM data, according to a hierarchical structure based on the Blu-ray Disc™ ROM standard format. In this hierarchical structure, content management units (CPS units) are set, and the content usage is managed on the basis of the content management units (CPS units). Details of the content management units (CPS units) are discussed below.

In the information recording medium, the sub-content 300 is stored together with the main content 200. The sub-content 300 is content stored in, such as a format that does not conform to a specific AV format, for example, the Blu-ray Disc™ ROM standard format.

The sub-content 300 includes game programs, image files, sound data, and text data, which serve as service data, and a set of a plurality of data files are defined as a data group.

The sub-content 300 shown in FIG. 3 includes a data group-1 311 through a data group-N 312. Each of the data groups can be set as a content management unit (CPS unit), in which case, the content usage is managed in units of data groups.

3. Encryption and Usage Management of Storage Data

Figure 4:
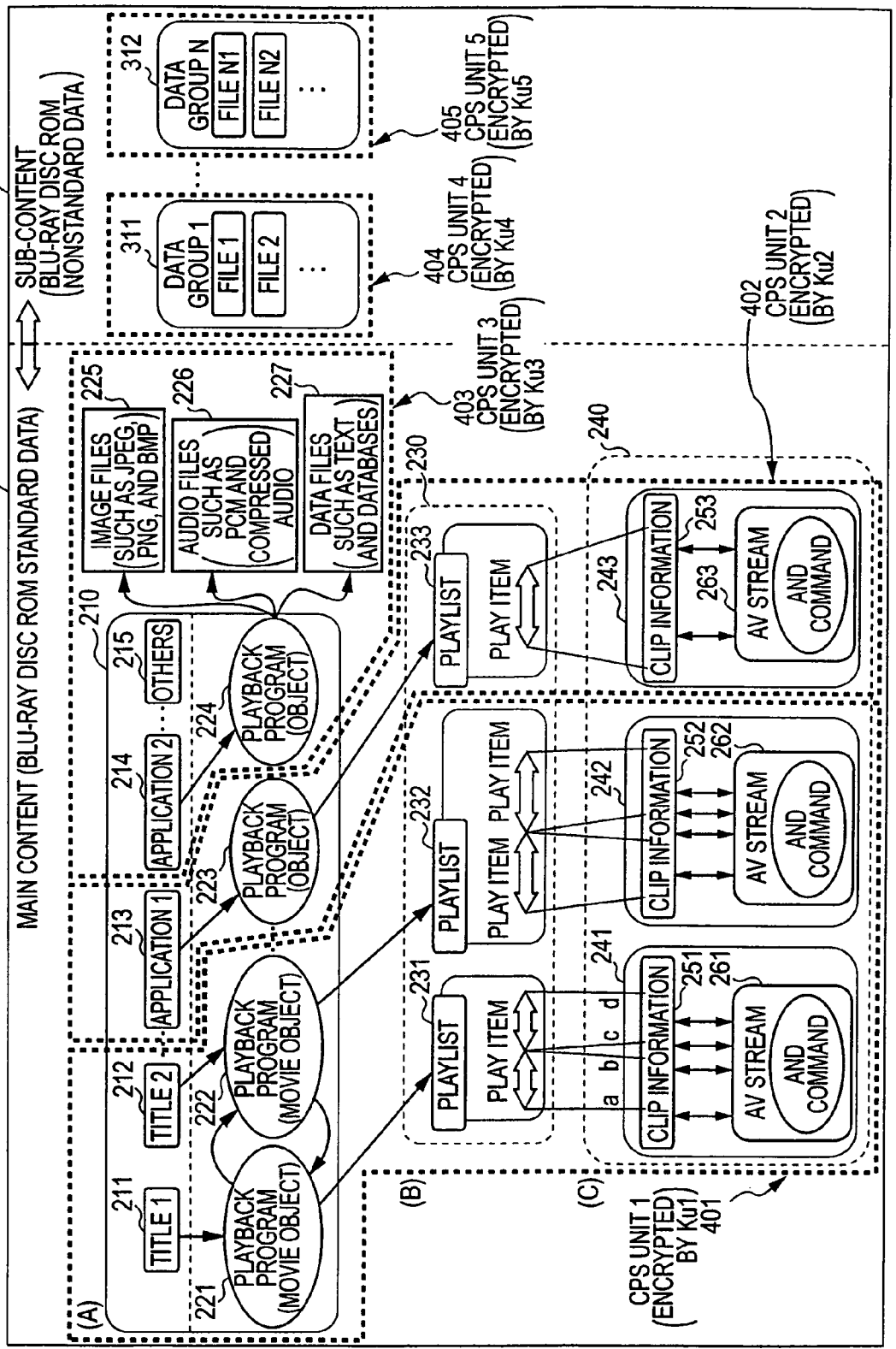
FIG. 4 illustrates an example of encrypting content management units set from content stored in an information recording medium.

A description is now given, with reference to, for example, FIG. 4, of a content management structure in which different types of usage control can be performed on individual content management units (CPS units) divided from content stored in an information recording medium.

As discussed with reference to FIG. 2, unit keys are assigned to individual content management units (CPS units) as different cryptographic keys. In other words, one unit key is assigned to each content management unit (CPS unit). The unit keys can be generated based on recording seeds corresponding to the associated CPS units.

Content belonging to each CPS unit is encrypted with the corresponding unit key, and when playing back the content, the unit key assigned to the CPS unit is obtained to decrypt the content. The unit keys can be independently obtained and managed. For example, the unit key assigned to unit A can be set as a key that is obtained from an information recording medium. The unit key assigned to unit B can be set as a key that is obtained by accessing a network-connected server and by conducting predetermined procedures by the user.

An example of setting a content management unit (CPS unit) to which a unit key is assigned is discussed below with reference to FIG. 4.

The configuration in which content management units (CPS units) of the main content 200 are set is first discussed below.

In the main content 200, the application index files 211 and 212 including at least one title of the application layer 210 indicated by (A) in FIG. 4 is set as a CPS unit. Similarly, the application execution files 213, 214 and 215 can be set as a CPS unit.

In FIG. 4, a CPS unit-1 401 includes the application index files 211 and 212, the playback programs 221 and 222, the playlists 231 and 232, and a set of AV stream files (clips 241 and 242) as real content data.

A CPS unit-2 402 includes the application execution file 213, the playback program 223, the playlist 233, and a set of AV stream files (clip 243) as real content data.

A CPS unit-3 403 includes the application execution files 214 and 215, the playback program 224, and various files (image files 225, audio files 226, data files 227) that can be obtained from information recording media or a network-connected server.

Files in those CPS units are encrypted with the corresponding CPS unit keys Ku1, Ku2, and Ku3 and are then stored in an information recording medium.

In FIG. 4, the content management units (CPS units) 401 and 402 are formed of the application layer 210 indicated by (A), which serves as the upper layer, the playback zone specifying file layer 230 indicated by (B), and the clip layer (content data files) indicated by (C), which serve as the lower layers. The content management unit (CPS unit) 403 is formed of the application layer 210 and various files, such as the image files 225, the audio files 226, and the data files 227, that can be obtained from an information recording medium or a network-connected server (i.e., the content management unit (CPS unit) 403 does not include (B) the playback zone specifying file layer 230 or (C) the clip layer 240).

As stated above, the content management unit (CPS unit)-1 401 includes the title-1 211, the title-2 212, the playback programs 221 and 222, the playlists 231 and 232, and the clips 241 and 242. The AV stream data files 261 and 262, which are real content data, contained in the two clips 241 and 242, respectively, are encrypted with the unit key Ku1 assigned to the content management unit (CPS unit)-1 401.

The content management unit (CPS unit)-2 402 includes the application file 213, for example, game content or web content, the playback program 223, the playlist 233, and the clip 243. The AV stream data file 263, which is real content data, contained in the clip 243 is encrypted with the unit key Ku2 assigned to the content management unit (CPS unit)-2 402. The application file 213 may also be encrypted with the unit key Ku2.

The content management unit (CPS unit)-3 403 includes the application files 214 and 215, the playback program 224, and various data files, such as the image files 226, the audio files 226, and the data files 227, that can be obtained from an information recording medium or a network-connected server by the playback program 224. The content management unit (CPS unit)-3 403 is encrypted with the unit key Ku3 assigned to the content management unit (CPS unit)-3 403.

To play back an application file or content associated with the content management unit (CPS unit)-1 401, it is necessary for the user to obtain the unit key Ku1 by using the recording seed Vu1 assigned to the content management unit (CPS unit)-1 401 and then to execute the content decryption sequence by using the unit key Ku1. After decrypting the content, the user can play back the content by executing the application program.

For example, to use the application file 214 or 215 or the image file 225, the audio file 226, or the data file 227 associated with the content management unit (CPS unit)-3 403, it is necessary for the user to obtain the unit key Ku3 assigned to the content management unit (CPS unit)-3 403 as the cryptographic key and then to decrypt the corresponding file. After decrypting the file, the user can execute the application program or the file.

An example of the directory structure storing content associated with content management units (CPS units) and management information concerning, for example, keys, is described below with reference to FIG. 5.

Figure 5:
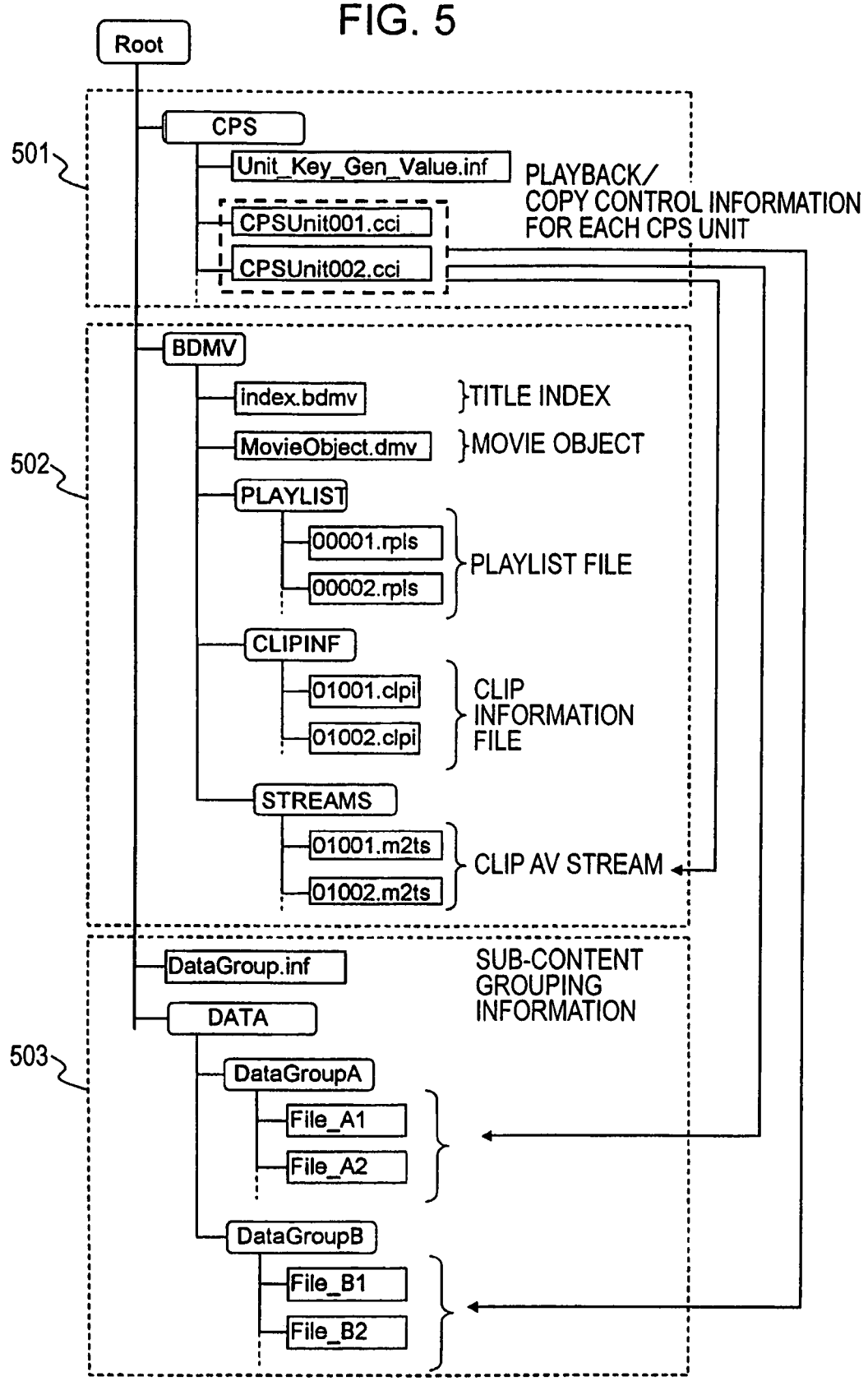
FIG. 5 illustrates an example of a directory structure of data stored in an information recording medium.

The directory structure shown in FIG. 5 includes a main content data portion 502, a sub-content data portion 503, and a content management data portion 501 associated with main content and sub-content. A BDMV directory indicated in the main content data portion 502 is set as a directory that manages content and applications based on the Blu-ray Disc™ ROM format.

The main content in compliance with the Blu-ray Disc™ ROM format has, as discussed with reference to FIGS. 3 and 4, a hierarchical structure including, for example, titles, objects, playlists, clip information, and clip AV streams. The data files forming those elements are set in the BDMV directory.

The directory of the sub-content data portion 503 is set as a directory that manages content and applications which do not conform to the Blu-ray Disc™ ROM format by dividing them into data groups. DataGroup.inf in the sub-content data portion 503 is a file that stores grouping information of sub-content.

The content management data portion 501 stores a management file associated with both the main content and sub-content, for example, the CPS management table shown in FIG. 2 for associating the CPS unit ID of each content management unit (CPS unit) with the recording seed information. The content management data portion 501 also stores content usage control information (CCI) including restriction information concerning content playback processing and copy processing set for each CPS unit.

The content usage control information (CCI) is set for each CPS unit, for example, as follows.

[CPS Unit 1]
Possible number of copies on recording medium: a
Possible number of playback operations: b
Remote-playback is allowed?: YES
[CPS Unit 2]
Possible number of copies on recording medium: 0
Possible number of playback operations: c
Remote-playback is allowed?: NO A specific example of the data structure of the content usage control information (CCI) is discussed below with reference to FIG. 6 in the context of CCI data based on XML. The content usage control information (CCI) shown in FIG. 6 includes basic information (basic) 521 and identification (id) information 522.

Details of the data shown in FIG. 6 are as follows. In the data, <cci_info type="basic"> indicates that the subsequent CCI information is basic information. Then, <cci_value type="EPN" data="0"/> indicates whether encrypted content is included in a CPS unit according to EPN=0/1. Then, <cci_value type="CCI" data="01"/> indicates whether content stored in a CPS unit can be copied according to CCI=00/01/10/11.

Additionally, other various content usage control information concerning, for example, analog output, whether copying is allowed or prohibited, or other network-connected devices.

The content usage control information (CCI) includes the identification information (id) 522. The identification information (id) 522 includes a studio ID [Studio_ID], which serves as identification information concerning a studio, which is an entity for providing content corresponding to the CPS unit to which the CCI is assigned, a package ID [Package_ID], which is identification information concerning a predetermined manufacturing unit of the information recording medium storing the CPS unit, and a CPS unit ID [CPS_Unit_ID], which is identification information concerning the CPS unit.

In the data shown in FIG. 6, <cci_value type="Studio_ID" data="AAAAAAAA"/>, <cci_value type="Package_ID" data="BBBBBBBB"/>, and <cci_value type="CPS_Unit_ID" data="001"/> are identification information. More specifically, the above-described identification information indicates that the studio ID [Studio_ID] is [AAAAAAAA], the package ID [Pacakge_ID] is [BBBBBBBB], and the CPS unit ID [CPS_Unit_ID] is [001].

When obtaining (downloading) data related to content set as a CPS unit, for example, subtitle data of movie content or additional data or updated data of content, from an external server, the information processing apparatus presents attribute information concerning the CPS unit, such as the studio ID, package ID, or CPS unit ID, to the server, and the server authenticates the information processing apparatus as an authorized user of the CPS unit. Then, the download data is provided to the information processing apparatus. Details of downloading processing for such data (i.e., subsequently generated/obtained data), are given below.

An example of a simplified XML form of the data shown in FIG. 6 is discussed below with reference to FIG. 7. As in the CCI data shown in FIG. 6, content usage control information (CCI) shown in FIG. 7 includes basic information (basic) 541 and identification information (id) 542. However, the above-described detailed information, such as EPN and CCI values (i.e., EPN=0 and CCI=01), are integrated into basic data= [00101] as the basic information (basic) 541.

Similarly, as the identification information (id) 542, the studio ID, package ID, and CPS unit ID are integrated into id data=[AAAAAAAABBBBBBBB001].

That is, in the example shown in FIG. 7, although the CCI file is recorded in a tag format, in each block of the CCI information, the CCI information recorded in the binary format is indicated in a hexadecimal format. The CCI information may indicate the same information embedded in an AV stream of, for example, MPEG-TS data. If the CCI information is recorded in a simplified form, such as that shown in FIG. 7, the same structure as that of binary format data in an AV stream can be used. When playing back the content, the information processing apparatus can check the CCI information embedded in the AV stream according to the same program.

Instead of being recorded in the above-described content usage control information (CCI), various ID information, such as the studio ID, package ID, and CPS unit ID, may be recorded in a data recording area other than the CCI area of the information recording medium. As stated above, the volume ID, which is a different manufacturing unit from the package ID, may be used.

4. Specific Examples of Playback Programs

Specific examples of playback programs forming content management units (CPS units) (i.e., the playback programs 221 through 224 shown in FIGS. 3 and 4) are discussed below. As stated above, the playback programs 221 through 224 can be set as, for example:

(1) playback programs having a program format, such as Java™, and referring to playlists, other images, sound, and data files; or (2) playback programs having a structure in a tag format, such as hypertext markup language (HTML) or extensible markup language (XML), and referring to playlist, other images, sound, and data files.

A description is now given of specific examples of playback programs having a tag format (i.e., XML).

As stated above, the playback programs can be set as programs:

(a) specifying a playlist or various data files necessary for playing back content in a CPS unit (content management unit);

(b) including information concerning a server to provide download content and executing downloading processing; and (c) query a server as to whether content in a CPS unit (content management unit) can be played back.

Specific examples of the above-described playback programs (a) through (c) indicated in XML are as follows.

As an example of the playback program based on the XML tag format, a program (a) specifying a playlist or various data files necessary for playing back content in a CPS unit (content management unit) is discussed below with reference to FIG. 8.

The program structure based on the XML tag format shown in FIG. 8 is one of the playback programs 221 through 224 discussed with reference to FIGS. 3 and 4. The playback structure shown in FIG. 8 has the following tag format data:

<object id="Vstream" type="video" data="PlayList#001"/>: reference to playlist;

<object id="Astream" type="audio" data="Sound.pcm"/>:reference to audio file;

<object id="Still" type="image/jpeg" data="Image.jpg"/>: reference to still image file; and <a href="MoreInfo.xml">MoreInfo</a>: reference to another data file.

Content playback processing is executed by obtaining the playlist, audio file, still image file, and data file designated by the above-described tag format data. The information processing apparatus analyzes the XML data and obtains the required information to play back the content. The program structure may be another formart, for example, Java™.

Programs (b) including information concerning a server or information to provide download content or information concerning a specific data file and executing downloading processing are now discussed below with reference to FIGS. 9, 10, and 11.

If content stored in an information recording medium is, for example, movie content without subtitle data, the corresponding subtitle data may be obtained from a server and is played back. Alternatively, additional information or updated information may be obtained from a server and content included in a CPS unit is played back by using the obtained information. In this case, a playback program including information concerning a server to provide subsequently generated/obtained data or information concerning a specific data file can be set, and required data can be obtained from the server by executing the program.

The program structure based on the XML tag format and including information concerning a specific data file shown in FIG. 9 is one of the playback programs 221 through 224 discussed with reference to FIGS. 3 and 4.

The following tag data shown in FIG. 9, <object id="Subtitle" type="text" data="[Server URL]/Subtitle1.txt"/>, includes information concerning the server URL and the data to be obtained [Subtitle1.txt] and executes the processing to download the data file from the designated URL.

The content designated by the URL is displayed after being downloaded. When downloading the content, it is preferable that authentication be conducted to check whether the user who has made access to the server is an authorized user. More specifically, content identification information contained in content usage control information (CCI) for a content management unit (CPS unit) stored in an information recording medium (i.e., the studio ID) which is an identifier of a studio, which is a content providing entity, or the package ID or volume ID, which is an identifier of a predetermined manufacturing unit of the information recording medium, is sent to the server, and the server checks the integrity of the content. If there is a serial ID, which is an identifier of the information recording medium, the integrity of the content can be checked by using the serial ID. Also, the user ID, which is identification data other than that concerning the information recording medium, may be used. A specific downloading sequence for this processing is described later.

The program structure based on the XML tag format and including a URL, which is identification information concerning a server to provide subsequently generated/obtained data, shown in FIG. 10 is one of the playback programs 221 through 224 discussed with reference to FIGS. 3 and 4.

The following tag data shown in FIG. 10, <script Start-Download( ) data="[Server URL]"/>, is tag data including the server URL. Access is made to the server by using the designated URL so that, for example, menu information concerning a list of content that can be downloaded from the server can be indicated on a display unit of an information processing apparatus (for example, a PC).

When an information recording medium, such as a ROM disc, storing content divided into content management units (CPS units) is manufactured, there may be some cases where information, such as the URL, concerning content to be downloaded has not yet determined. In this case, a program, such as that shown in FIG. 10, including only the server URL to provide download data is set rather than a program, such as that shown in FIG. 9, including data file specifying information. That is, as in the program shown in FIG. 10, only the URL that is first accessed when obtaining download data is recorded, and detailed information concerning download data or a download menu stored in the server can be obtained or displayed by the server URL. With this configuration, the extensibility or maintainability can be enhanced.

The program structure based on the XML tag format shown in FIG. 11 is also one of the playback programs 221 through 224 discussed with reference to FIGS. 3 and 4. In the program shown in FIG. 11, the URL, which serves as identification information concerning a server to provide subsequently generated/obtained data, and additional sending information for obtaining download data from the server designated by the URL are set.

The following tag data shown in FIG. 11, <script Start-Download( ) data="[Server URL]"extention="value1" is tag data including the server URL and an additional information setting portion [extention="value1"]. Access is made to the server based on the designated URL, and the server checks the data set in the additional information setting portion [extention="value1"] and provides the corresponding download data.

It is now assumed, for example, that game score information concerning a game program as the management data of a CPS unit is sent to the server, and the server sends a download menu, which is different from that sent to general users, to users having high scores. In this case, score data generated during the execution of the game program is set in the additional information setting portion [extention="value1"] and is sent to the server. The server checks whether the game score satisfies predetermined conditions, and sends the download data only when the conditions are satisfied.

The specific structure of the program (c) querying a server as to whether content in a CPS unit (content management unit) can be played back is discussed below with reference to FIGS. 12 and 13.

The playback program based on the XML tag format shown in FIG. 12, which is an example of the above-described type of program (c), is one of the playback programs 221 through 224 discussed with reference to FIGS. 3 and 4. In the program shown in FIG. 12, the URL, which serves as identification information concerning a server to query whether CPS unit content can be played back, is set.

The following tag data shown in FIG. 12, <script Check-Playable( ) data="[Server URL]"/>, is tag data including the server URL. Access is made to the server by the designated URL to query the server whether the CPS unit content can be played back. In this case, identification information concerning the CPS unit, for example, the unit ID, studio ID, or package ID, or volume ID, that can specify the CPS unit is sent to the server, and the server checks whether the CPS unit content can be played back based on the identification information.

The information processing apparatus plays back the content on the condition that a playback permission message is received from the server. A specific sequence for this processing is discussed later.

The playback program based on the XML tag format shown in FIG. 13 is another example of the playback program (c) querying a server as to whether content in a CPS unit (content management unit) can be played back. The playback program shown in FIG. 13 is also one of the playback programs 221 through 224 discussed with reference to FIGS. 3 and 4. In the program shown in FIG. 13, the URL, which serves as identification information concerning the server to query whether CPS unit content can be played back, is set. In the program shown in FIG. 13, additional sending information for obtaining a playback permission from the server designated by the URL is also set.

The following tag data shown in FIG. 13, [script Check-Playable( ) data="[Server URL]"extension="value1"/>, is tag data including the server URL and an additional information setting portion [extention="value1"]. Access is made to the server by using the designated URL, and the server checks the data set in the additional information setting portion [extention="value1"] to determine whether the content can be played back. The information processing apparatus plays back the content on the condition that data indicating a playback permission is received from the server. A specific sequence for this processing is described later.

As the program shown in FIG. 11 including additional information for downloading content, the program shown in FIG. 13 includes additional information for obtaining playback permission information. It is now assumed, for example, that game score information concerning game program as the management data of a CPS unit is sent to the server, and the server gives a permission to play back special content only to users having high scores. In this case, score data generated during the execution of the game program is set in the additional information setting portion [extention="value1"] and is sent to the server. The server checks whether the game score satisfies predetermined conditions, and permits the playback operation only when the conditions are satisfied.

5. Content Usage Processing Accompanying Access to Server

When reading and playing back CPS unit data from an information recording medium storing content managed on the basis of content usage management units (CPS units), processing in accordance with the playback program associated with the CPS unit is executed. The playback programs include, as discussed with reference to FIGS. 8 through 13:

(a) specifying a playlist or various data files necessary for playing back content in a CPS unit (content management unit) (FIG. 8);

(b) including information concerning a server to provide download content and executing downloading processing (FIGS. 9 through 11); and (c) querying a server as to whether content in a CPS unit (content management unit) can be played back (FIGS. 12 and 13).

When obtaining download data or making a query as to whether content can be played back, the information processing apparatus accesses the server to obtain necessary download data or playback permission information. A description is now given of content usage processing accompanying access to a server.

FIG. 14 illustrates an information processing apparatus 600, such as a PC, performing a playback operation on an information recording medium. The information processing apparatus 600 includes a controller 601 having a program executing function, such as a central processing unit (CPU), that plays back content and executes programs, a data storage unit 602, such as a hard disk, a recording medium interface 603 that inputs and outputs data into and from an information recording medium, a memory 604, for example, a random access memory (RAM) or a ROM, used as a program execution area or a parameter storage area, and a communication interface 605 that performs communication via a network. In FIG. 14, only a minimal configuration of the information processing apparatus 600 for generating or obtaining subsequently generated/obtained data is shown, and a specific hardware configuration of the information processing apparatus 600 is described later.

The information processing apparatus 600 obtains a specific playback program (i.e., one of the playback programs 221 through 224 discussed with reference to FIGS. 3 and 4) via the recording medium interface 603 based on index information, such as a title belonging to a CPS unit stored in the information recording medium 100. The playback programs are XML description programs discussed with reference to FIGS. 8 through 13. The programs are executed under the control of the controller 601.

5-1. Content Downloading from Server by Playback Program

Details of downloading of content from a server based on a playback program are given below with reference to the flowchart in FIG. 15. The content downloading processing is performed based on one of the playback programs discussed with reference to FIGS. 9 through 11.

In FIG. 15, the information processing apparatus of a user (client) executes the playback program corresponding to a CPS unit read from the information recording medium. The playback program includes downloading processing discussed with reference to FIGS. 9 through 11. In step S101, the information processing apparatus sends a request for downloading the content to the URL of the server recorded in the playback program. In this case, the information processing apparatus sends information for identifying the CPS unit of the corresponding playback program, together with the request, to the server.

The information for identifying the CPS unit includes the content management unit identifier (CPS unit ID), studio ID, package ID, and volume ID. The ID information is recorded in the content usage control information (CCI) associated with the CPS unit, as discussed with reference to FIGS. 6 and 7, and the information processing apparatus obtains the ID from the CCI information associated with the CPS unit and sends it to the server. As stated above, the ID information may be stored in a data storage area other than the area storing the CCI information.

Steps S102 through S106 are steps executed by the server. In step S102, the server determines whether the user requesting to download the content is an authorized user based on basic information, such as the content management unit identifier (CPS unit ID), studio ID, package ID, or volume ID. If it is determined in step S102 that the user is an unauthorized user, the process proceeds to step S110 in which downloading processing is terminated.

If it is determined in step S102 that the user requesting to download the content is an authorized user, the process proceeds to step S103. In step S103, if there is any additional information, it is analyzed, and it is determined whether the additional information satisfies download permitting conditions. This processing corresponds to processing for checking the additional information to determine whether download data can be provided, as discussed with reference to FIG. 11. For example, game score information concerning a game program as management data of a CPS unit is sent to the server, and the server gives a permission to download the content only to users having high scores.

If the server determines in step S103 that the additional information does not satisfy the download permitting conditions, the process proceeds to step S110 in which downloading processing is terminated.

If it is determined in step S103 that the additional information satisfies the download permitting conditions, the process proceeds to step S104 to determine whether sending information from the user includes download-file specifying information. For example, in the playback program discussed with reference to FIG. 9, a file to be downloaded is specified. If download-file specifying information is included, the process proceeds to step S107 in which downloading processing is executed.

If it is determined in step S104 that download-file specifying information is not included, the process proceeds to step S105. In step S105, the server selects a download menu stored in the server to send it to the information processing apparatus. The server stores a plurality of download menus associated with basic information and additional information. The server then selects the menu corresponding to the basic information and additional information received from the user, and sends the selected menu to the information processing apparatus.

The download menus indicate a list of content to be downloaded, and have a function of allowing the user to select download content. The download menus also have a function of checking with the user to accept additional downloading conditions. As the format of the download menus, the format (for example, Java™ or XML) defined by the AV standards of recording media (for example, BD-ROM discs) can be used since the download menus are displayed under the execution of programs in the information processing apparatus (i.e., under the execution of the normal content playback programs).

In step S106, the server receives download-file specifying information from the information processing apparatus, and sends a data file corresponding to the download-file specifying information to the information processing apparatus.

Then, in step S107, the user executes downloading processing. Then, in step S108, the user stores the downloaded data in a data storage unit, such as a hard disk or a removable memory, in the information processing apparatus. In this case, the downloaded data is stored as management data based on CPS units. The recording and management of subsequently generated/obtained data, such as downloaded data, is discussed below.

Details of the downloading processing by the server are given below with reference to the flowchart in FIG. 16. In step S201, the server analyzes basic information received from the user (i.e., CPS unit identification information, such as content management unit identifier (CPS unit ID), studio ID, package ID, or volume ID). Then, in step S202, the server determines whether there is content that can be downloaded in association with the analyzed basic information. If there is no corresponding content, the process proceeds to step S210 in which the server sends a downloading disable message to the user. The processing is then completed.

If it is determined in step S202 that there is content to be downloaded, the process proceeds to step S203 to determine whether additional information is specified (i.e., whether the program includes additional information as a condition to permit downloading, for example, the program shown in FIG. 11). If additional information is specified, the process proceeds to step S204. In step S204, the server analyzes the additional information to determine whether the additional information satisfies download permitting conditions. This processing corresponds to processing for checking whether the additional information satisfies the conditions for providing download data, as discussed with reference to FIG. 11. For example, game score information concerning a game program as management data of a CPS unit to the server, and the server gives a permission to download the content only to users having high scores.

Examples of download permitting conditions using specific additional information are as follows:

(1) a predetermined game score has been obtained;
(2) a membership of a certain service is held;
(3) a predetermined point of a certain service has been obtained;
(4) the user has already paid for downloading content; and
(5) the number of downloading operations allowed for content has not been reached.

The server determines whether downloading is permitted based on those conditions. If it is determined in step S204 that the additional information does not satisfy the download permitting conditions, the process proceeds to step S210 in which the server sends a downloading disable message to the user.

If it is determined in step S203 that additional information is not specified, or if it is determined in step S204 that downloading is permitted, the process proceeds to step S205. In step S205, the server selects a download menu associated with the basic information received from the user from a plurality of download menus, and sends the selected download menu to the user. In step S206, upon receiving download-file specifying information from the user, the server sends the data file corresponding to the download-file specifying information. Then, in step S207, the server sends the download file. The processing is then completed.

As discussed above, the information processing apparatus manages the content downloaded from the server as content management units (CPS units). Processing performed on the data downloaded from the server or the data generated while playing back CPS unit content by the information processing apparatus (subsequently generated/obtained data) is as follows.

FIG. 17 illustrates specific examples of data generated or obtained by the information processing apparatus 600.

The information processing apparatus 600 plays back content which is managed on the basis of a plurality of CPS units from the information recording medium 100.

For example, a CPS unit-A 640 is a content management unit containing a game program, and the information processing apparatus 600 executes this game program to generate game in-progress information 641 and game score information 642, respectively, as subsequently generated/obtained data. The information processing apparatus 600 then sets the subsequently generated/obtained data 641 and 642 as data forming the CPS unit-A 640 and stores them in the information recording medium 100 or a storage unit, such as a hard disk, contained in the information processing apparatus 600.

A CPS unit-B 650 is a content management unit containing moving-picture AV stream content, such as a movie, and the information processing apparatus 600 obtains subtitle data 651 associated with the AV stream content from the server 611 as subsequently generated/obtained data according to the above-described downloading processing, and plays back the subtitle data 651. The information processing apparatus 600 then sets the subtitle data 651 as data forming the CPS unit-B 650 and stores it in the information recording medium 100 or a storage unit, such as a hard disk, contained in the information processing apparatus 600.

In the above-described examples, the subsequently generated/obtained data is included in the same CPS unit as that of the corresponding content. Alternatively, new CPS units may be set for subsequently generated/obtained data, and then, the subsequently generated/obtained data may be stored as data forming the new CPS units in the information recording medium 100, or a storage unit, such as a hard disk contained in the information processing apparatus 600 or a removable memory. As the new CPS units, CPS units corresponding to new data, such as those indicated in the new data field 121 shown in FIG. 2, are set. The recording seeds Vu associated with the new CPS units are prestored in the information recording medium 100, and CPS unit keys are generated by using the recording seeds Vu according to a predetermined encryption processing sequence. By using the generated CPS unit keys, the subsequently generated/obtained data are encrypted and are then stored in the information recording medium 100 or a storage unit, such as a hard disk contained in the information processing apparatus 600 or a removable memory.

The recording seeds Vu associated with the new CPS units may be obtained from an external server. In this case, however, it is desirable that predetermined authentication processing be conducted between the server and the information processing apparatus 600 to prevent the unauthorized operation to obtain the recording seeds Vu. The recording seeds Vu are obtained in association with the elements forming the CPS units in the management table shown in FIG. 2.

Encryption and management of subsequently generated/obtained data is described below with reference to FIG. 18.

Figure 18:
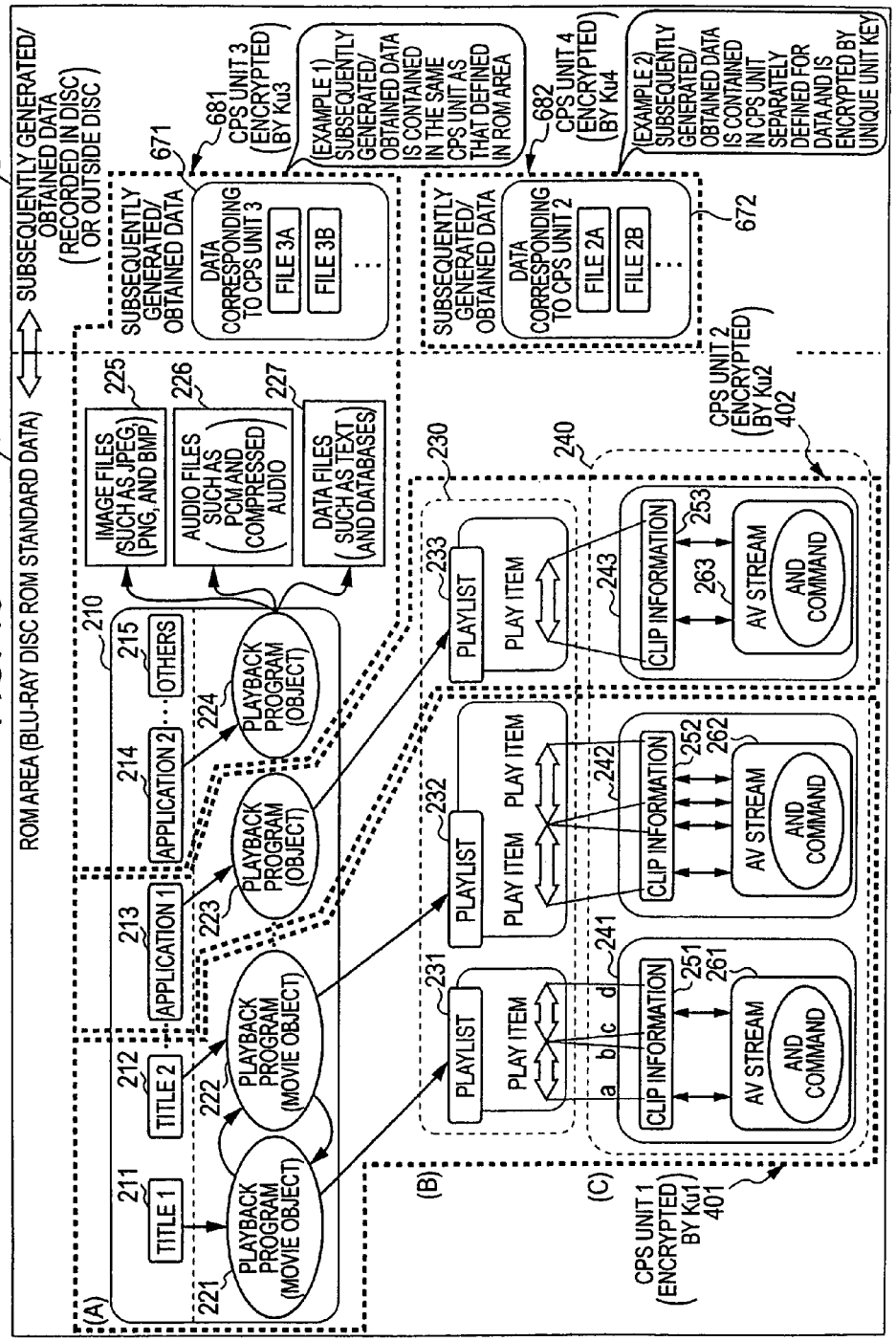
FIG. 18 illustrates the relationship between subsequently generated/obtained data and CPS units.

FIG. 18 illustrates an example of a data encryption method when data generated or obtained in accordance with the playback operation for content stored in an information recording medium is recorded in or outside the information recording medium.

In FIG. 18, the data area shown at the left side is data stored in the information recording medium (i.e., ROM area data 660), and the data area shown at the right side is subsequently generated/obtained data 670 as data generated or obtained afterwards. The subsequently generated/obtained data 670 is stored in a data writable area of the information recording medium, a hard disk, or an external storage unit, such as a removable memory. In FIG. 18, two examples are shown as the methods for setting CPS units for subsequently generated/obtained data.

Example 1

As indicated in a CPS unit-3 681 shown in FIG. 18, subsequently generated/obtained data 671 is integrated into a CPS unit that has been set in the information recording medium.

The CPS unit-3 681 contains data stored in the data area 660 of the information recording medium and also integrates the subsequently generated/obtained data 671 therein. In this case, the subsequently generated/obtained data 671 or data contained in the subsequently generated/obtained data 671 is encrypted with the unit key Ku3 generated by using the recording seed Vu3 set for the CPS unit 3, and is then stored in the information recording medium or a storage unit, such as a hard disk.

In this example, the subsequently generated/obtained data 671 is encrypted with the same key as the unit key for the CPS unit defined in the ROM area of the information recording medium, and when playing back the content, the subsequently generated/obtained data 671 can be decrypted with the same key as the data contained in the CPS unit defined in the ROM area. Accordingly, the seamless playback operation can be implemented without the need to change keys.

Example 2

As indicated in a CPS unit-4 682 in FIG. 18, a new CPS unit, which is different from the CPS unit defined in the information recording medium, is set for subsequently generated/obtained data 672.

The CPS unit-4 682 is separately defined for the subsequently generated/obtained data 672, and the data contained in the subsequently generated/obtained data 672 is encrypted with the corresponding unit key. The CPS unit-4 682 is managed independently of the data stored in the information recording medium. In this case, it is necessary to set and record, as management data, information for assigning the CPS unit to the subsequently generated/obtained data 672 and information for generating the unit key.

An example of the method for setting content usage control information for subsequently generated/obtained data as management data is discussed below with reference to FIG. 19.

Figure 19:
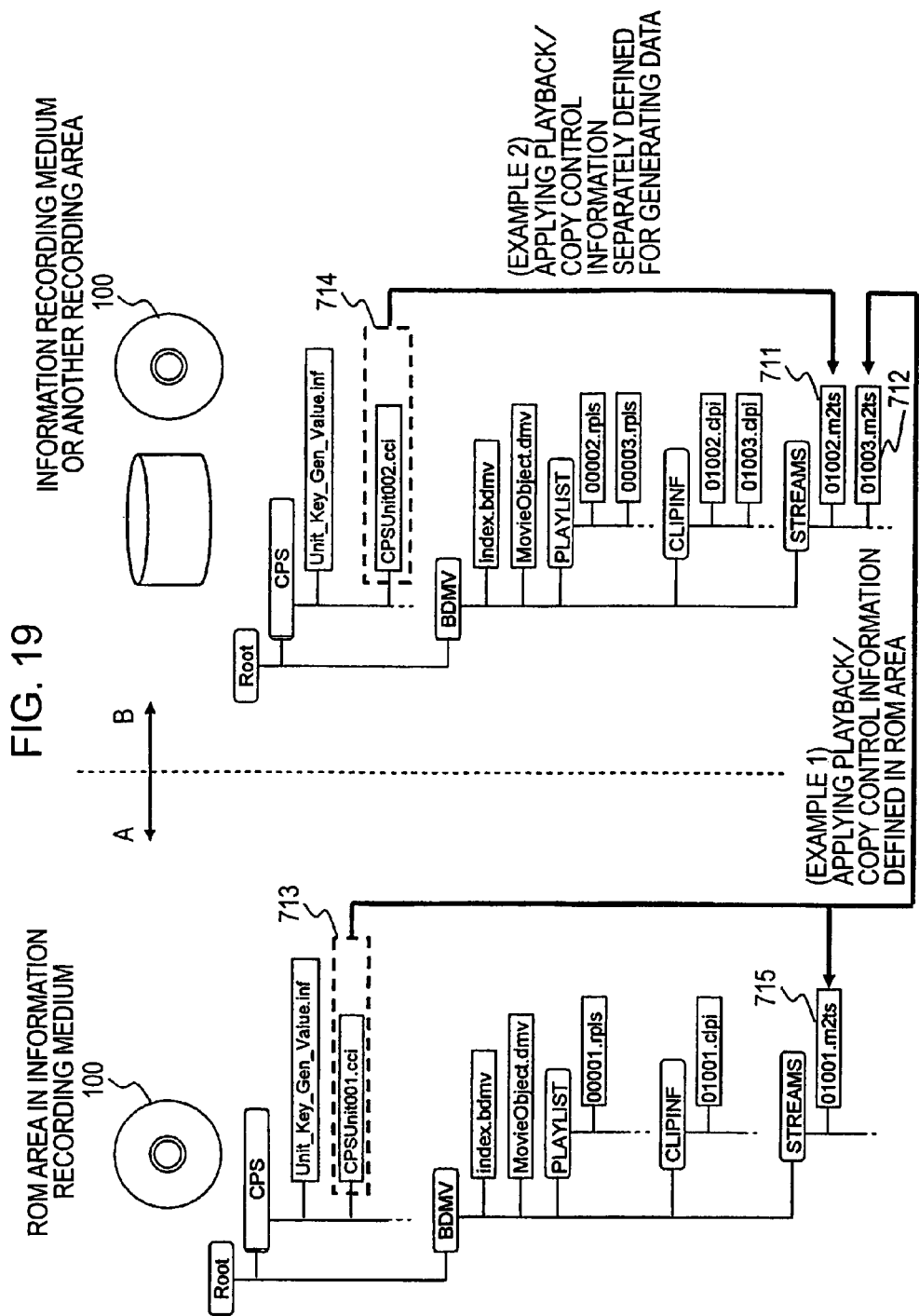
FIG. 19 illustrates examples of setting content usage control information for data subsequently generated/obtained by an information processing apparatus.

FIG. 19 illustrates directory A corresponding to CPS management units that have been stored in the information recording medium 100 and directory B corresponding to subsequently generated/obtained data. In both the directory A and directory B shown in FIG. 19, the data are set in the BDMV directory as content based on the Blu-ray Disc™ ROM standard format, and various management data are stored in the CPS directory.

The content usage control information is recorded by one of the following two methods.

Example 1

Existing content usage control information is used as content usage control information for subsequently generated/obtained data.

More specifically, content usage control information [CPSUnit001.cci] 713 associated with data [01001.m2ts] 715 of CPS unit 001 stored in the information recording medium 100 is directly used, as shown in FIG. 19, as content usage control information associated with subsequently generated/obtained data [01003.m2ts] 712. In this case, it is not necessary to generate content usage control information corresponding to the subsequently generated/obtained data [01003.m2ts] 712. The content usage control information [CPSUnit001.cci] 713 associated with CPS unit 001 is set as content usage information used for both the existing data [01001.m2ts] 715 and the subsequently generated/obtained data [01003.m2ts] 712.

Example 2

New content usage control information is generated for subsequently generated/obtained data. More specifically, new content usage control information [CPSUnit002.cci] 714 is generated and managed for subsequently generated/obtained data [01002.m2ts] 711, as shown in FIG. 19.

The method in example 1 is suitable on the occasion when, for example, subtitle data of a language which is not recorded in the ROM area of the information recording medium 100 is downloaded and is played back together with video/audio data recorded in the ROM area. In this case, it is natural to consider that both the data recorded in the ROM area and the downloaded data belong to the same CPS unit.

The method in example 2 is suitable on the occasion when, for example, it is desired that data generated by executing an application program read from the information recording medium 100 be shared and copied among a plurality of users. Although data, such as applications and AV streams, recorded in the ROM area cannot be copied, data generated by an application (for example, information that can be sent to other users or to other portable machines, such as game score information and map information) may be played back or copied. In this case, content usage control, such as playback/copy control, different from that recorded in the ROM area is necessary.

Figure 20:
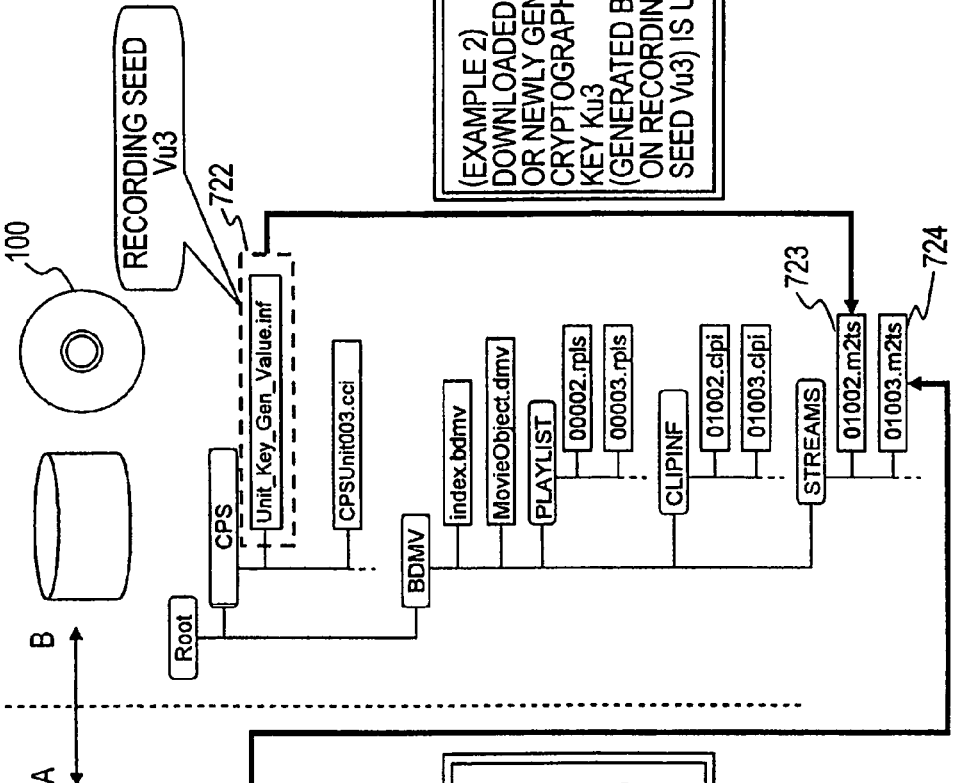
FIG. 20 illustrates examples of setting cryptographic key information for data subsequently generated/obtained by an information processing apparatus.

FIG. 20 illustrates an example of the method for setting recording seeds used for generating cryptographic keys (i.e., unit keys associated with individual CPS units).

As in FIG. 19, FIG. 20 illustrates directory A associated with CPS management units that have been stored in the information recording medium 100 and directory B associated with subsequently generated/obtained data. In both the directory A and directory B shown in FIG. 12, data are set in the BDMV directory as content based on the Blu-ray Disc™ ROM standard format, and various management data are stored in the CPS directory.

The recording seed is associated with each CPS unit identifier (CPS unit ID), as indicated in the CPS unit management table discussed with reference to FIG. 2. Cryptographic key information [Unit_Key_Gen_Value.inf] 721 shown in FIG. 20 corresponds to the CPS unit management table stored in the information recording medium 100.

Recording seeds associated with the CPS units are set for subsequently generated/obtained data by one of the following two methods.

Example 1

As the recording seeds for generating cryptographic keys for subsequently generated/obtained data, the recording seeds for new data that have been set in the CPS unit management table are used.

More specifically, the recording seed that has been set in the new data field 121 of the CPS unit management table shown in FIG. 2 is used as the recording seed for generating a cryptographic key for the subsequently generated/obtained data. In FIG. 20, the recording seed that has been set in the new data field 121 of the cryptographic key information [Unit_Key_Gen_Value.inf] 721, which is the management table data, stored in the information recording medium 100 is used as the recording seed for subsequently generated/obtained data [01003.m2ts] 724. In this example, a new CPS unit is defined, and the recording seed that has been set in the new data field 121 can be used.

Example 2

As the recording seeds for generating cryptographic keys for subsequently generated/obtained data, new recording seeds are generated or obtained. In FIG. 20, cryptographic key information [Unit_Key_Gen_Value.inf] 722, which is new management table data, is set for subsequently generated/obtained data [01002.m2ts] 723, and a new CPS unit identifier set as a new entry is associated with the recording seed. If the generation of recording seeds is allowed, the data processor of the information recording apparatus 600 generates new recording seeds by using, for example, random numbers. In this example, the setting of CPS units and the generation of recording seeds are allowed for new data without any restriction.

In the information processing apparatus 600, when a new CPS unit is set, it is necessary to associate management data (i.e., content usage control information) with the new CPS unit. In this case, one of the above-described two methods discussed with reference to FIG. 19 can be used, and more specifically, the existing content usage control information may be associated or new content usage information may be set and associated with the new CPS unit.

Figure 21:
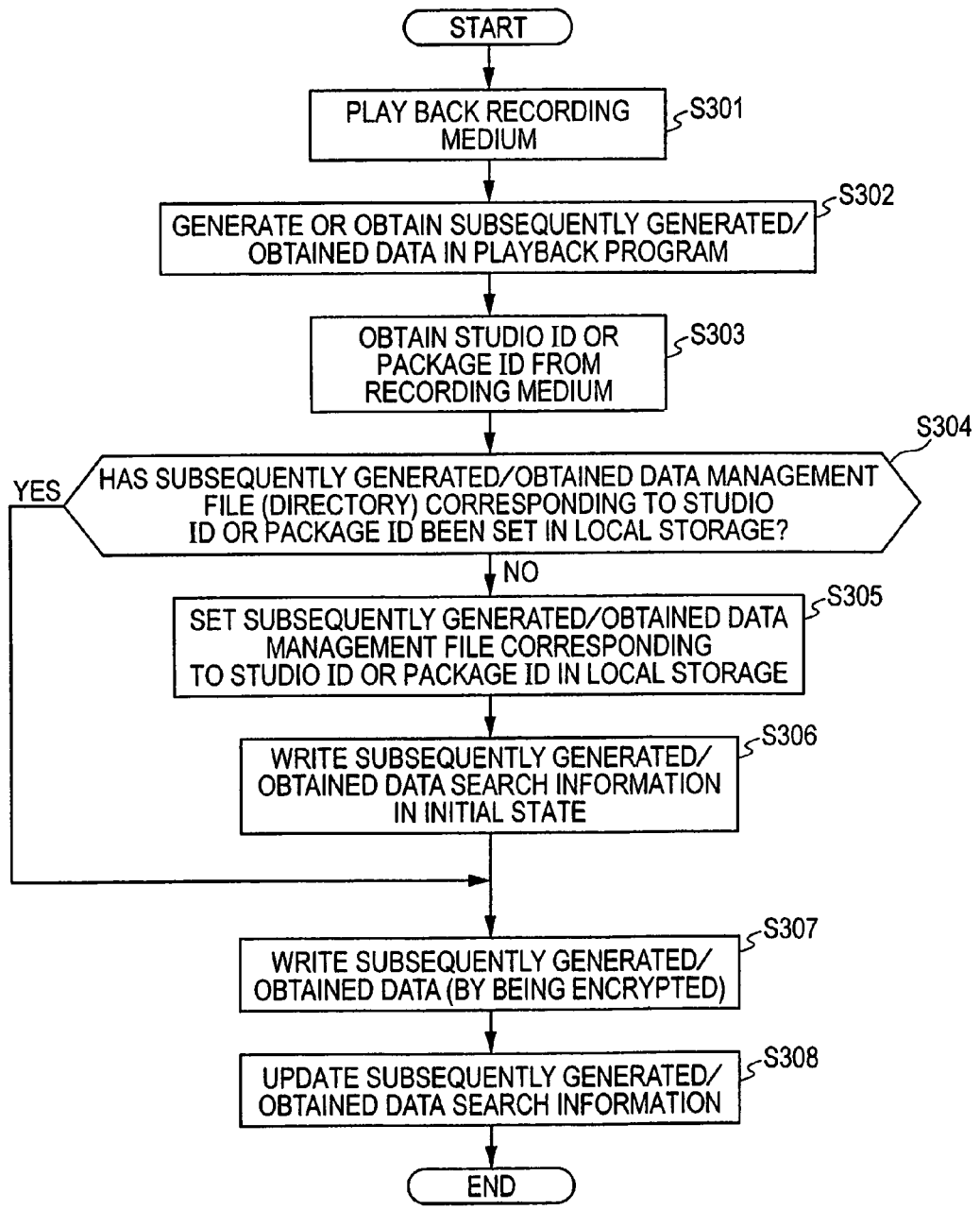
FIG. 21 is a flowchart illustrating a sequence for storing subsequently generated/obtained data.

A description is given below, with reference to the flowchart in FIG. 21, of a sequence for storing subsequently generated/obtained data, such as download data, in an information recording medium of a user (client), such as a hard disk, by an information processing apparatus. The information processing apparatus first installs an information recording medium, such as a ROM disc, storing CPS management units in the apparatus, and then generates or obtains data while playing back a program or data contained in a CPS management unit.

In step S301, the information processing apparatus installs a recording medium, such as a ROM disc, storing CPS management units, to play back a program or data contained in a CPS management unit. Then, in step S302, the information processing apparatus generates data, for example, score data or character data of a game program, or obtains data, for example, subtitle data or comment data of specific content, from an external server.

In step S303, the information processing apparatus obtains the studio ID or package ID of a CPS unit to be played back (i.e., the CPS unit recorded on the recording medium, such as a ROM disc). Such ID information specifies content for which subsequently generated/obtained data is obtained, and can be obtained from CPS unit management information stored in the recording medium or from information contained in the currently played back CPS unit.

The information processing apparatus then determines in step S304 whether a subsequent generated/obtained data management file corresponding to the studio ID or the package ID extracted in step S303 has already been set in a local storage in which subsequently generated/obtained data is recorded (i.e., in a hard disk or a removable recording medium). The information processing apparatus generates a subsequently generated/obtained data management file including download data and stores it in a local storage. The subsequently generated/obtained data management file is set in association with, for example, the studio ID or package ID.

If it is found in step S304 that the corresponding management file is not yet set, the process proceeds to step S305. In step S305, the subsequent generated/obtained data management file corresponding to the studio ID or the package ID extracted in step S303 is set in the directory of the local storage. Then, in step S306, information associated with the management file generated in step S305 is written into subsequent generated/obtained data search information, which is set for searching for subsequently generated/obtained data. The subsequently generated/obtained data search information includes, for example, the directory name, file name, offset information, and the amount of data, and is set in the directory as the subsequently generated/obtained data search information file.

After step S306, or if it is determined in step S304 that the corresponding management file has already been set, the process proceeds to step S307 in which subsequent generated/obtained data is stored in the management file. In this case, the subsequent generated/obtained data management file is stored after being encrypted, and tamper verifying values, such as hash values or a digital certificate, are generated and encrypted.

As the cryptographic key for the subsequently generated/obtained data, for example, the device ID, studio ID, package ID, volume ID, or user ID, is used. The device ID is the ID that can be set for licensed programs. For example, the device ID is generated based on identification information that is set in hardware as a device into which a licensed program allowed to process CPS units is legally installed. The device ID can be obtained only by licensed programs that have been installed legally. Accordingly, in a PC into which various application software programs are installed, the acquisition of the device ID or the generation of the cryptographic key by applications other than licensed applications can be prevented.

Then, in step S308, based on the data information stored in the management file, the subsequent generated/obtained data search information is updated. The processing is then completed. When encrypting the subsequent generated/obtained data management file, block encryption is performed by using, for example, the 2048-byte-based AES-CBC mode, which enables the decryption of the management file on the basis of blocks.

Figure 22:
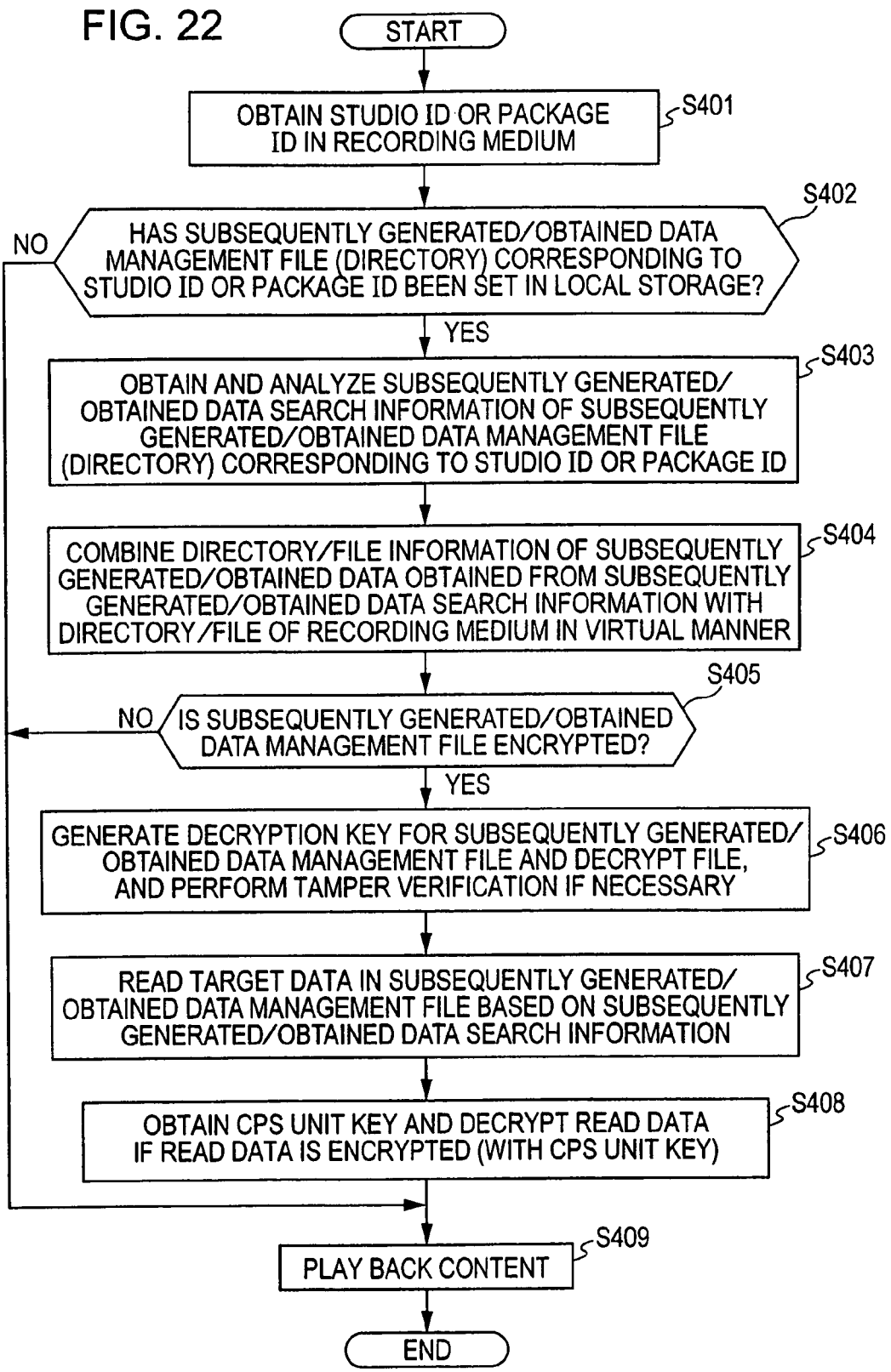
FIG. 22 is a flowchart illustrating a sequence for playing back content using subsequently generated/obtained data.

The sequence for playing back content using subsequent generated/obtained data in the information processing apparatus of the user (client) is now discussed below with reference to the flowchart in FIG. 22.

In step S401, the information processing apparatus first installs an information recording medium, such as a ROM disc, storing CPS management units in the apparatus to obtain the studio ID or the package ID associated with a CPS management unit to be played back. Such ID information can be obtained from CPS unit management information stored in the recording medium or from information contained in the currently played back CPS unit.

The information processing apparatus then determines in step S402 whether a subsequent generated/obtained data management file corresponding to content which is uniquely identified by the studio ID or the package ID obtained in step S401 has already been set in a local storage in which subsequent generated/obtained data is recorded (i.e., in a hard disk or a removable recording medium).

If it is found in step S402 that there is no subsequent generated/obtained data management file corresponding to the studio ID or the package ID, the process proceeds to step S409. In step S409, only content stored in the recording medium is played back, in which case, the CPS unit key is obtained and the content is decrypted based on the CPS unit key if necessary.

If it is found in step S402 that the subsequent generated/obtained data management file corresponding to the studio ID or the package ID has been set in the local storage, the process proceeds to step S403. In step S403, the subsequent generated/obtained data search information is obtained from the local storage, and the corresponding subsequent generated/obtained data management file is selected from the search information. Then, in step S404, the directories and files including the management file on the local storage are combined with the directories and files on the recording medium in a virtual manner. In this processing, the data files on the recording medium and the related files on the local storage can be processed as files in the single virtual directory. According to this processing, fast access to files stored in different recording media can be achieved.

It is then determined in step S405 whether the subsequent generated/obtained data management file is encrypted. If the management file is not encrypted, the process proceeds to step S409 in which the content using the unencrypted subsequent generated/obtained data is played back.

If it is found in step S405 that the subsequent generated/obtained data management file is encrypted, the process proceeds to step S406. In step S406, a key for decrypting the encrypted management file is generated, and the management file is decrypted with the generated key. The decryption key can be generated in various modes, and more specifically, the key can be generated based on various IDs, such as the device ID, studio ID, package ID, volume ID, and user ID, according to a key generation algorithm, for example, an AES cryptographic key generation algorithm.

If tamper verifying data, such as hash values or a digital certificate, are added to the subsequent generated/obtained data management file, the integrity of the management file is checked based on the tamper verifying data. If it is found that the management file has been tampered with, the playback processing using the subsequent generated/obtained data management file is terminated. A determination as to whether the playback processing using the management file can be continued is defined in the execution program of a licensed program that is allowed to use CPS unit data.

Then, after decrypting the management file, in step S407, the target data stored in the management file is obtained based on the subsequent generated/obtained data search information. Then, in step S408, if the obtained data is encrypted, it is decrypted. More specifically, if the obtained data is AV data in a CPS unit encrypted with a CPS unit key, the CPS unit key is obtained to decrypt the AV data. Then, in step S409, the content using the subsequent generated/obtained data is played back.

5-2. Obtaining Playback Permission Information from Server by Playback Program A description is given blow of content playback processing performed on the condition that playback permission information is obtained from a server based on a playback program. This processing is executed based on the execution of the playback program discussed with reference to FIG. 12 or 13.

Figure 23:
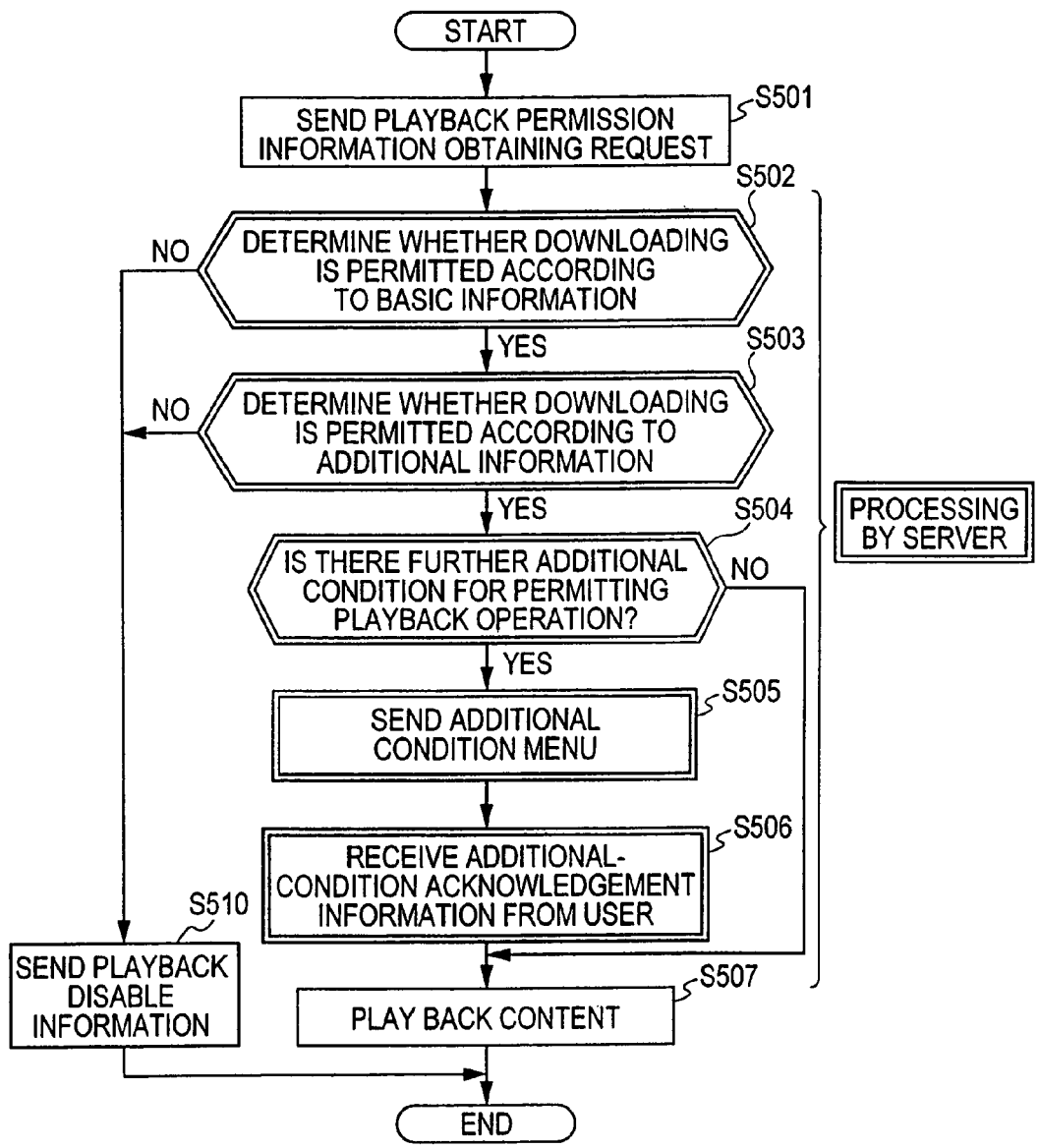
FIG. 23 is a flowchart illustrating a sequence for playback processing using subsequently generated/obtained data.

A sequence for obtaining playback permission information from a server is first discussed with reference to the flowchart in FIG. 23. The information processing apparatus of a user (client) executes the playback program corresponding to a CPS unit read from an information recording medium. The playback program includes a program for obtaining content playback permission information from the server, which is discussed with reference to FIGS. 12 and 13.

In step S501, the information processing apparatus sends a playback permission information obtaining request to the URL of the server recorded in the program. When sending this request, the information processing apparatus also sends information for identifying the CPS unit corresponding to the playback program.

The information for identifying the CPS unit includes, for example, the content management unit identifier (CPS unit ID), studio ID, package ID, and volume ID. The ID information is recorded, as discussed with reference to FIGS. 6 and 7, in the content usage control information (CCI) associated with the CPS unit, and the information processing apparatus obtains the ID information from the CCI information, and sends it to the server. As stated above, the ID information may be stored in a data storage area other than the area storing the CCI information.

Steps S502 through S506 are steps executed by the server that receives the playback permission information obtaining request. In step S502, the server determines whether the user who has sent the playback permission information obtaining request is an authorized user based on the basic information, such as the content management unit identifier (CPS unit), studio ID, package ID, or volume ID. If it is determined in step S502 that the user is an unauthorized user, the process proceeds to step S510 in which the server sends a playback disable message to the user. The processing is then terminated.

If it is determined in step S502 that the user is an authorized user, the process proceeds to step S503. In step S503, if there is additional information, it is analyzed to determine whether the additional information satisfies playback permission conditions. This processing corresponds to processing for checking the additional information to determine whether a playback permission can be obtained discussed with reference to FIG. 11. For example, game score information concerning a game program as management data of a CPS unit is sent to the server, and the server gives a permission to playback content only to users having high scores.

If it is determined in step S503 that the additional information does not satisfy the playback permission conditions, the process proceeds to step S510 in which playback processing is terminated.

Examples of playback permission determination conditions using specific additional information are as follows:
(1) a predetermined game score has been obtained;
(2) a membership of a certain service is held;
(3) a predetermined point of a certain service has been obtained;
(4) the user has already paid for playback operation; and
(5) the number of playback operations allowed for content has not been reached.

Those conditions are preset, and the server determines whether the playback operation is permitted based on the conditions. If the server determines in step S503 that the playback operation is not permitted, the process proceeds to step S510 which the server sends a playback disable message to the user.

If it is determined in step S503 that the additional information satisfies the playback permission conditions, the process proceeds to step S504 to check for another additional condition for permitting the playback operation. If there is no additional condition, playback permission information is sent to the information processing apparatus. Then, in step 507, upon receiving the playback permission information, the information processing apparatus plays back the content.

If it is determined in step S504 that there is another additional condition for permitting the playback operation, the process proceeds to step S505. In step S505, the server selects an additional condition menu associated with the basic information and additional information received from the user from a plurality of additional condition menus, and sends the selected menu to the user.

The additional condition menus have a function of checking with the user to accept the additional conditions. As the format of the additional condition menus, the format (for example, Java™ or XML) defined by the AV standards of recording media (for example, BD-ROM discs) can be used since the additional condition menus are displayed under the execution of programs in the information processing apparatus, i.e., under the execution of the normal content playback programs.

In step S506, upon receiving additional-information acknowledgement information from the user, the server sends playback permission information to the user. Then, in step S507, upon receiving the playback permission information, the information processing apparatus of the user plays back the content.

6. Example of Configuration of Information Processing Apparatus

Figure 24:
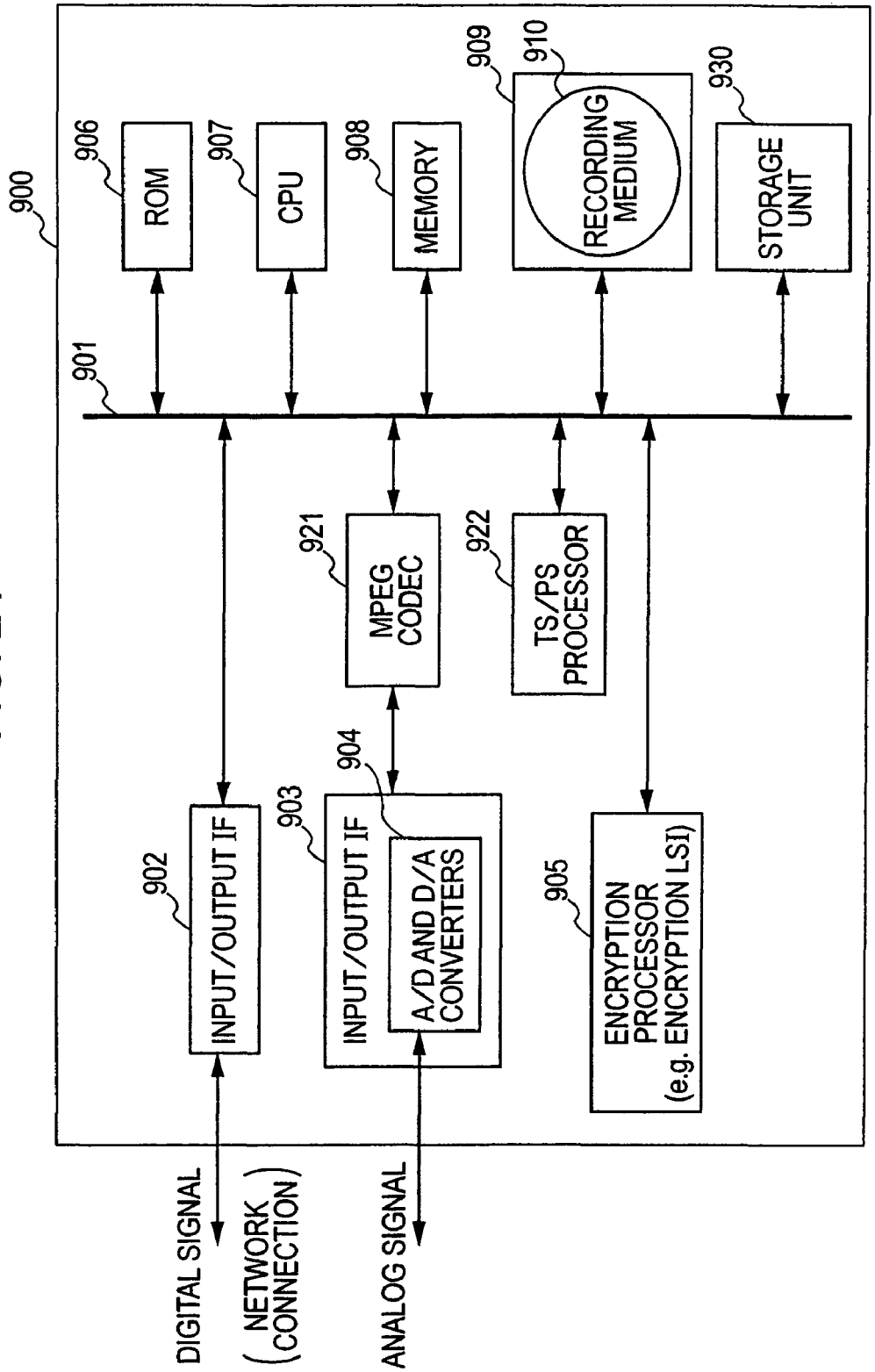
FIG. 24 illustrates an example of an information processing apparatus that performs recording/playback processing by installing an information recording medium therein.

An example of the configuration of an information processing apparatus 900 that records or plays back data on or from information recording media storing CPS-unit content is described below with reference to FIG. 24.

The information processing apparatus 900 includes a drive 909 for driving an information recording medium 910 to input or output data recording/playback signals, a CPU 907, which serves as a controller for performing data processing according to various programs, a ROM 906, which serves as a storage area for programs and parameters, a memory 908, an input/output interface (IF) 902 for inputting or outputting digital signals, an input/output interface (IF) 903, which includes analog-to-digital (AD) and digital-to-analog (DA) converters 904, for inputting or outputting analog signals, an MPEG codec 921 for encoding or decoding MPEG data, a transport-stream/program-stream (TS/PS) processor 922 for executing TS/PS processing, an encryption processor 905 for executing various encryption processing operations, and a storage unit 930, such as a hard disk. The above-described blocks are connected to a bus 901.

In the information processing apparatus 900 configured as described above, when playing back AV stream data of MPEG-TS data from the information recording medium 910, the data read from the information recording medium 910 is first decrypted in the encryption processor 905 if necessary. Then, the data is demultiplexed into video, audio, and subtitle data in the TS/PS processor 922.

Digital data decoded in the MPEG codec 921 is converted into an analog signal in the DA converter 904 of the input/output interface 903 and is output. If a digital data is output, the MPEG-TS data decrypted in the decryption processor 905 is output via the input/output interface 902 as the digital data. In this case, the digital data is output to a digital interface, such as an IEEE1394 interface, an Ethernet cable, or a wireless local area network (LAN). If data is output via a network, the input/output interface 902 has a network connecting function.

If the information processing apparatus 900 converts data into a format that can be received by a destination device, the video, audio, and subtitle data demultiplexed in the TS/PS processor 922 are subjected to rate conversion and codec conversion in the MPEG codec 921, and are again multiplexed into MPEG-TS or MPEG-PS data in the TS/PS processor 922. Then, the multiplexed data is output from the digital input/output interface 902. In this case, the video, audio, and subtitle data may be coded and converted into a multiplexed file in the format other than MPEG under the control of the CPU 907, and is then output from the digital input/output interface 902.

The CPS unit management table (see FIG. 2), which serves as the CPS unit management information, and management data, such as content usage control information, for example, playback/copy control information, for each CPS unit, are read from the information recording medium 910 and are then stored in the memory 908. Key information required for playing back a CPS unit can be obtained from the data stored in the memory 908.

The operation for recording subsequently generated/obtained data by the information processing apparatus 900 is as follows. Two cases can be considered where data to be recorded is input as a digital signal and an analog signal. If a digital signal is input, it is input via the digital signal input/output interface 902 and is then encrypted in the encryption processor 905 if necessary, and is then stored in the information recording medium 910. If the input digital signal is stored after converting its data format, the data format of the digital signal is converted by the MPEG codec 921, the CPU 907, and the TS/PS processor 922, and then, the resulting digital signal is encrypted in the encryption processor 905 and is stored in the recording medium 910.

If the input signal is an analog signal, it is input via the input/output interface 903 and is converted into a digital signal by the AD converter 904. The digital signal is then converted by the MPEG codec 921 into a codec that is used when being recorded.

Then, the codec is converted into AV multiplexed data, which is a recording data format, by the TS/PS processor 922, and is encrypted by the encryption processor 905 if necessary. The resulting data is then stored in the information recording medium 910. Content management information is also generated together with the content to be recorded, and is stored in the information recording medium 910.

If necessary information is obtained from an external source via a network by the information processing apparatus 900, it is stored in the memory 908. Such information includes key information necessary for playing back content, data to be played back together with the content, such as subtitle, audio, and still image data, content management information, and operation rules (usage rules) applied to a playback device in accordance with the content management information.

The program for executing playback or recording processing is stored in the ROM 906, and, if necessary, the memory 908 is used for storing data while executing the program.

Processing for generating, obtaining, and recording subsequently generated/obtained data is discussed below. The drive 909 reads an execution program or analyzable data from the information recording medium 910 and stores it in the memory 908. The program is then executed or the data is analyzed under the control of the CPU 907.

Subsequently generated/obtained data is temporarily stored in the memory 908, and is then stored in the information recording medium 910 or the storage unit 930, such as a hard disk, according to a user selection or a predetermined control sequence.

The program for executing playback/recording processing is stored in the ROM 906, and the memory 908 is used as a parameter/data storage area or a work area if necessary while the program is being executed. The information processing apparatus 900 shown in FIG. 24 is a device that can perform both recording and playback operations. However, it should be appreciated that a device having only a recording function or a playback function can also be used.

A series of processing jobs described in the specification may be executed by hardware, software, or a combination thereof. If software is used, a program containing a processing sequence can be installed into a memory of a computer built in dedicated hardware or into a general-purpose computer that can execute various processing jobs.

The program can be prerecorded in a recording medium, such as a hard disk or a ROM. The program can also be recorded (stored) temporarily or permanently in a removable recording medium, such as a flexible disk, a CD-ROM, a magneto-optical (MO) disk, a DVD, a magnetic disk, or a semiconductor memory. Such a removable recording medium can be provided as so-called "package software".

Instead of being installed into a computer from the above-described removable recording medium, the program may be transferred wirelessly to the computer from a download site, or by wired means, such as a network, for example, a LAN or the Internet. The computer receives the program and installs it in a recording medium, such as a built-in hard disk.

The various processing jobs may be executed in chronological order as described in the specification. Alternatively, they may be executed in parallel or individually according to the performance of a device that performs processing or according to the necessity. In this specification, the system is a logical set of a plurality of devices, and it is not necessary that the devices be in the same housing.

It should be understood by those skilled in the art that various modifications, combinations, sub-combinations and alterations may occur depending on design requirements and other factors insofar as they are within the scope of the appended claims or the equivalents thereof.

The invention is claimed as follows:

1. An information processing apparatus comprising:
a data processor;
a communication unit; and
a memory device storing instructions which when executed by the data processor, cause the data processor to operate with the communication unit to, for a first one of a plurality of content management units recorded on an information recording medium:
 (a) execute a program which corresponds to said first content management unit, wherein:
  (i) content is divided into the plurality of content management units, the plurality of content management units being distinct from the information recording medium and each of the plurality of content management units having corresponding usage control information; and
  (ii) the first content management unit includes a plurality of storage areas, the plurality of storage areas of the first content management unit including:
   (A) a content file having first content stored therein; and
   (B) a usage control information file having first usage control information including basic identification information stored therein;
 (b) obtain the basic identification information stored in the first content management unit recorded on the information recording medium;
 (c) send the obtained basic identification information to an access destination which is determined based on information indicated in the program;
 (d) send additional information to the access destination, the additional information being used for determining whether a download permitting condition or a playback permitting condition is satisfied;
 (e) if it is determined that the playback permitting condition is satisfied:
  (i) receive information associated with said playback permitting condition; and
  (ii) thereafter, record the received information associated with said playback permitting condition in at least one of the plurality of storage areas of said first content management unit recorded on the information recording medium; and
 (f) if it is determined that the download permitting condition is satisfied:
  (i) generate an encrypted file which includes a download data set obtained from the access destination; and
  (ii) thereafter, record said generated encrypted file in at least one of the plurality of storage areas of said first content management unit recorded on the information recording medium.

2. The information processing apparatus of claim 1, wherein the basic identification information includes at least one of:
 (a) a studio ID which includes an identifier of a studio, wherein said studio is an entity for providing the content included in the content management unit;
 (b) a package ID or a volume ID, which includes identification information concerning a manufacturing unit of the information recording medium; and
 (c) a content management unit ID, which includes an identifier of the content management unit, from the information recording medium.

3. The information processing apparatus of claim 1, wherein the instructions, when executed by the data processor, cause the data processor to obtain the basic identification information from the usage control information recorded in the information recording medium in association with the first content management unit.

4. The information processing apparatus of claim 1, wherein the instructions, when executed by the data processor, cause the data processor to play back the content included in the first content management unit if the playback permission information is obtained from the access destination.

5. The information processing apparatus of claim 1, wherein the instructions, when executed by the data processor, cause the data processor to obtain the additional information from a data writable area of the information recording medium or a separate recording medium.

6. A content management system comprising:
a client configured to execute a program corresponding to a first one of a plurality of content management units recorded on an information recording medium, wherein:
 (a) the information recording medium stores content divided into the plurality of content management units, the plurality of content management units being distinct from the information recording medium and each of the plurality of content management units having corresponding usage control information; and
(b) the first content management unit includes a plurality of storage areas, the plurality of storage areas of the first content management unit including:
   (A) a content file having first content stored therein; and
   (B) a usage control information file having first usage control information including basic identification information stored therein; and
a server configured to:
(a) receive, from the client, the basic identification information stored in the first content management unit recorded on the information recording medium;
(b) determine, based on the basic identification information received from the client, whether a download data set for the first content management unit is to be provided or whether content playback permission information concerning content corresponding to the first content management unit is to be provided, the program being a data sending execution program which sends additional information to the server; and
(c) determine, based on the additional information received from the client, whether a download permitting condition or a playback permitting condition is satisfied; and
(d) if it is determined that the playback permitting condition is satisfied:
   (i) provide information associated with said playback permitting condition to the client; and
   (ii) thereafter, record the information associated with said playback permitting condition in at least one of the plurality of storage areas of said first content management unit recorded on the information recording medium; and
(e) if it is determined that the download permitting condition is satisfied:
   (i) generate an encrypted file which includes a download data set obtained from the access destination; and
   (ii) thereafter, record said generated encrypted file in at least one of the plurality of storage areas of said first content management unit recorded on the information recording medium.

7. The content management system of claim 6, wherein the basic identification information includes at least one of:
(a) a studio ID which includes an identifier of a studio, wherein said studio is an entity for providing the content included in the content management unit;
(b) a package ID or a volume ID, which serves as identification information concerning a manufacturing unit of the information recording medium; and
(c) a content management unit ID which serves as an identifier of the content management unit.

8. The content management system of claim 6, wherein the client obtains the additional information from a data writable area of the information recording medium or a separate recording medium.

9. A non-transitory information recording medium comprising:
content divided into a plurality of content management units, the plurality of content management units being distinct from the non-transitory information recording medium and each of the plurality of content management units having corresponding usage control information, said plurality of content management units including a first content management unit which includes a plurality of storage areas, the plurality of storage areas of the first content management unit including:
(A) a content file having first content stored therein; and
(B) a usage control information file having first usage control information including basic identification information stored therein; and
a program corresponding to each of the plurality of content management units as storage information, wherein:
(a) the program includes at least one of information concerning a first location from which download data set for said first content management unit associated with a program is obtained and information concerning a second location from which playback permission information concerning content corresponding to the first content management unit is obtained;
(b) the program is a data sending execution program including additional information used for determining whether a download permitting condition or a playback permitting condition is satisfied;
(c) if it is determined that the playback permitting condition is satisfied:
   (i) information associated with said playback permitting condition is provided to the client; and
   (ii) the information associated with said playback permitting condition is recorded in at least one of the plurality of storage areas of said first content management unit recorded on the non-transitory computer readable medium; and
(d) if it is determined that the downloading permission permitting condition is satisfied:
   (i) an encrypted file is generated which includes the download data set obtained from the second location; and
   (ii) said generated encrypted file is recorded in at least one of the plurality of storage areas of said first content management unit recorded on the information recording medium.

10. The non-transitory information recording medium of claim 9, wherein the additional information is recorded in a data writable area of the information recording medium.

11. An information processing method comprising:
executing a program corresponding to a first one of a plurality of content management units recorded on an information recording medium, wherein:
(i) the information recording medium stores content divided into the plurality of content management units, the plurality of content management units being distinct from the information recoding medium and each of the plurality of content management units having corresponding usage control information; and
(ii) the first content management unit includes a plurality of storage areas, the plurality of storage areas of the first content management unit including:
   (A) a content file having first content stored therein; and
   (B) a usage control information file having first usage control information including basic identification information stored therein;
obtaining the basic identification information stored in the first content management unit recorded on the information recording medium;
sending the obtained basic identification information to an access destination that is determined based on information indicated in the program;

sending additional information to the access destination for determining whether a download permitting condition or a playback permitting condition is satisfied based on the additional information;
if it is determined that the playback permitting condition is satisfied:
(i) receiving information associated with said playback permitting condition; and
(ii) thereafter, recording the received information associated with said playback permitting condition in at least one of the plurality of storage areas of said first content management unit recorded on the information recording medium; and
if it is determined that the download permitting condition is satisfied:
(i) generating an encrypted file which includes a download data set obtained from the access destination; and
(ii) thereafter, recording said generated encrypted file in at least one of the plurality of storage areas of said first content management unit recorded on the information recording medium.

12. A program stored in a non-transitory computer readable medium for allowing a computer to execute information processing comprising:
executing a program corresponding to a first one of a plurality of content management units recorded on an information recording medium, wherein:
(i) the information recording medium stores content divided into the plurality of content management units, the plurality of content management units being distinct from the information recording medium and each of the plurality of content management units having corresponding usage control information; and
(ii) the first content management unit includes a plurality of storage areas, the plurality of storage areas of the first content management unit including:
(A) a content file having first content stored therein; and
(B) a usage control information file having first usage control information including basic identification information stored therein;
obtaining the basic identification information stored in the first content management unit recorded on the information recording medium;
sending the obtained basic identification information to an access destination that is determined based on information indicated in the program;
sending additional information to the access destination for determining whether a download permitting condition or a playback permitting condition is satisfied based on the additional information;
if it is determined that the playback permitting condition is satisfied:
(a) receiving information associated with said playback permitting condition; and
(b) thereafter, recording the received information associated with said playback permitting condition in at least one of the plurality of storage areas of said first content management unit recorded on the information recording medium;
if it is determined that the download permitting condition is satisfied:
(a) generating an encrypted file which includes a download data set obtained from the access destination; and
(b) thereafter, recording said generated encrypted file in at least one of the plurality of storage areas of said first content management unit recorded on the information recording medium.

13. An information processing apparatus comprising:
a data processor; and
a memory device storing instructions which when executed by the data processor, cause the data processor to, for a first one of a plurality of content management units recorded on an information recording medium:
(i) execute a program corresponding to the first content management unit provided with corresponding control information, wherein:
(a) the information recording medium has content stored thereon, the content being divided into the plurality of content management units and including at least one of a studio ID of a package ID, the plurality of content management units being distinct from the information recording medium and each of the plurality of content management units having corresponding usage control information; and
(b) the first content management unit includes a plurality of storage areas, the plurality of storage areas of the first content management unit including:
(A) a content file having first content stored therein; and
(B) a usage control information file having first usage control information including basic identification information stored therein; and
(ii) in response to the program being executed:
(a) at least one of the studio ID and package ID is obtained;
(b) said studio ID or said package ID is sent to an access destination determined by the execution of the program corresponding to the first content management unit;
(c) processing for obtaining a download data set for the content management unit or for obtaining playback permission information concerning content corresponding to the content management unit is performed;
(d) additional information is sent to the access destination for determining whether a download permitting condition or a playback permitting condition is satisfied;
(e) if it is determined that the playback permitting condition is satisfied:
(i) processing for receiving information associated with said playback permitting condition is performed; and
(ii) thereafter, the received information associated with said playback permitting condition is recorded in at least one of the plurality of storage areas of said first content management unit recorded on the information recording medium; and
(f) if it is determined that the download permitting condition is satisfied:
(i) generate an encrypted file which includes a download data set obtained from the access destination; and
(ii) thereafter, said generated encrypted file is recorded in at least one of the plurality of storage areas of said first content management unit recorded on the information recording medium.

* * * * *